(12) United States Patent
Talken et al.

(10) Patent No.: US 11,267,194 B2
(45) Date of Patent: *Mar. 8, 2022

(54) FABRICATION OF SOLID MATERIALS OR FILMS FROM A POLYMERIZABLE LIQUID

(71) Applicant: Molecule CORP, Concord, CA (US)

(72) Inventors: Nick Talken, Lafayette, CA (US); Austin Wyatt Levy, Redondo Beach, CA (US); Zack Kisner, Lafayette, CA (US); Ken Kisner, Lafayette, CA (US)

(73) Assignee: Molecule CORP, Concord, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/598,707

(22) Filed: Oct. 10, 2019

(65) Prior Publication Data

US 2020/0102413 A1 Apr. 2, 2020

Related U.S. Application Data

(63) Continuation of application No. PCT/US2018/026858, filed on Apr. 10, 2018.

(60) Provisional application No. 62/484,644, filed on Apr. 12, 2017, provisional application No. 62/484,103, filed on Apr. 11, 2017.

(51) Int. Cl.
| | |
|---|---|
| *C08F 220/34* | (2006.01) |
| *B29C 64/124* | (2017.01) |
| *B29C 64/40* | (2017.01) |
| *B29C 64/386* | (2017.01) |
| *B29C 64/135* | (2017.01) |
| *C08F 2/48* | (2006.01) |
| *C08F 222/10* | (2006.01) |
| *C08F 226/10* | (2006.01) |
| *C08F 265/06* | (2006.01) |
| *C08F 290/06* | (2006.01) |
| *C08F 299/06* | (2006.01) |
| *C08F 2/50* | (2006.01) |
| *C08F 212/08* | (2006.01) |
| *C08F 220/06* | (2006.01) |
| *C08F 220/56* | (2006.01) |
| *C08F 220/58* | (2006.01) |
| *C08G 69/14* | (2006.01) |
| *C09D 11/322* | (2014.01) |
| *C09D 11/38* | (2014.01) |
| *B29C 64/00* | (2017.01) |
| *B33Y 70/00* | (2020.01) |
| *B33Y 80/00* | (2015.01) |

(52) U.S. Cl.
CPC .......... *B29C 64/124* (2017.08); *B29C 64/00* (2017.08); *B29C 64/135* (2017.08); *B29C 64/386* (2017.08); *B29C 64/40* (2017.08); *C08F 2/48* (2013.01); *C08F 2/50* (2013.01); *C08F 212/08* (2013.01); *C08F 220/06* (2013.01); *C08F 220/34* (2013.01); *C08F 220/56* (2013.01); *C08F 220/58* (2013.01); *C08F 222/1006* (2013.01); *C08F 226/10* (2013.01); *C08F 265/06* (2013.01); *C08F 290/067* (2013.01); *C08F 299/065* (2013.01); *C08G 69/14* (2013.01); *C09D 11/322* (2013.01); *C09D 11/38* (2013.01); *B33Y 70/00* (2014.12); *B33Y 80/00* (2014.12)

(58) Field of Classification Search
CPC ... C09D 11/38; C09D 11/322; C08F 299/165; C08F 290/067; C08F 222/1006; C08F 222/58; C08F 222/56; C08F 222/34; C08F 222/06; C08F 212/08; C08F 2/50; C08F 2/48

See application file for complete search history.

(56) References Cited

U.S. PATENT DOCUMENTS

| | | | |
|---|---|---|---|
| 3,213,058 | A | 10/1965 | Boyle et al. |
| 4,337,130 | A | 6/1982 | Ahramjian |
| 4,389,514 | A | 6/1983 | Schmidle et al. |
| 4,421,822 | A | 12/1983 | Levens et al. |
| 5,017,461 | A | 5/1991 | Abe |
| 5,236,637 | A | 8/1993 | Hull et al. |
| 5,298,532 | A | 3/1994 | Ali et al. |
| 5,374,500 | A | 12/1994 | Carpenter, Jr. et al. |
| 5,391,072 | A | 2/1995 | Lawton et al. |
| 5,529,473 | A | 6/1996 | Lawton et al. |
| 5,836,313 | A | 11/1998 | Perez et al. |
| 6,602,975 | B2 | 8/2003 | Hubbell et al. |

(Continued)

FOREIGN PATENT DOCUMENTS

| | | |
|---|---|---|
| CN | 102715751 A | 10/2012 |
| EP | 1632533 A1 | 3/2006 |

(Continued)

OTHER PUBLICATIONS

Sachin Velankar, Jose Pazos, Stuart L. Cooper, High-performance UV-curable urethane acrylates via deblocking chemistry, Journal of Applied Polymer Science, Nov. 28, 1996, 1361-1376, 62 (9), Wiley Periodicals, Inc.

(Continued)

*Primary Examiner* — Sanza L. McClendon

(74) *Attorney, Agent, or Firm* — Vivacqua Crane PLLC

(57) ABSTRACT

The disclosure describes a polymerizable liquid that includes a reactive oligomer and a reactive monomer. The polymerizable liquid is an energy polymerizable liquid hardenable by a single reaction mechanism forming a Photoplastic material. The disclosure further describes a method of producing the Photoplastic material and articles that can be made from the Photoplastic material.

30 Claims, 21 Drawing Sheets

(56) References Cited

U.S. PATENT DOCUMENTS

| | | |
|---|---|---|
| 6,692,891 B2 | 2/2004 | Jung et al. |
| 6,861,475 B2 | 3/2005 | Ilenda et al. |
| 6,894,113 B2 | 5/2005 | Court et al. |
| 6,916,867 B2 | 7/2005 | Gugumus |
| 6,932,930 B2 | 8/2005 | DeSimone et al. |
| 6,939,940 B2 | 9/2005 | Dingemans et al. |
| 7,157,586 B2 | 1/2007 | Wood et al. |
| 7,438,846 B2 | 10/2008 | John |
| 7,507,784 B2 | 3/2009 | Dingemans et al. |
| 7,534,844 B2 | 5/2009 | Lee et al. |
| 7,550,246 B2 | 6/2009 | Fukuzumi et al. |
| 7,556,490 B2 | 7/2009 | Wicker et al. |
| 7,625,977 B2 | 12/2009 | Lutz et al. |
| 7,642,316 B2 | 1/2010 | Rego et al. |
| 7,649,029 B2 | 1/2010 | Kolb et al. |
| 7,651,682 B2 | 1/2010 | Devore et al. |
| 7,651,683 B2 | 1/2010 | Devore et al. |
| 7,695,643 B2 | 4/2010 | Fritzsche et al. |
| 7,767,728 B2 | 8/2010 | Lu et al. |
| 7,820,760 B2 | 10/2010 | Pham et al. |
| 7,824,839 B2 | 11/2010 | Ober et al. |
| 7,892,474 B2 | 2/2011 | Shkolnik et al. |
| 7,919,162 B2 | 4/2011 | DeSimone et al. |
| 7,935,476 B2 | 5/2011 | Teng |
| 8,088,245 B2 | 1/2012 | Lutz et al. |
| 8,110,135 B2 | 2/2012 | El-Siblani |
| 8,119,214 B2 | 2/2012 | Schwantes et al. |
| 8,232,043 B2 | 7/2012 | Williamson et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 2002/0016386 A1 | 2/2002 | Napadensky |
| 2006/0222831 A1 | 10/2006 | Sloan |
| 2007/0027233 A1 | 2/2007 | Yamaguchi et al. |
| 2008/0090931 A1 | 4/2008 | Nagvekar |
| 2008/0292807 A1* | 11/2008 | Krawczyk ............ B41J 2/17536 427/508 |
| 2010/0280151 A1 | 11/2010 | Nguyen et al. |
| 2012/0251841 A1 | 10/2012 | Southwell et al. |
| 2013/0292862 A1 | 11/2013 | Joyce |
| 2013/0295212 A1 | 11/2013 | Chen et al. |
| 2014/0072806 A1 | 3/2014 | Allen et al. |
| 2015/0184039 A1 | 7/2015 | Lutz et al. |
| 2015/0215430 A1 | 7/2015 | Votour |
| 2015/0240113 A1 | 8/2015 | Pratt et al. |
| 2015/0097316 A1 | 12/2015 | DeSimone et al. |
| 2016/0137839 A1 | 5/2016 | Rolland et al. |
| 2016/0167323 A1 | 6/2016 | Valeri |
| 2017/0252971 A1 | 9/2017 | Fujifilm |

FOREIGN PATENT DOCUMENTS

| | | |
|---|---|---|
| EP | 2123711 A1 | 11/2009 |
| JP | 2012210408 A | 11/2012 |
| WO | 2012129968 A1 | 10/2012 |
| WO | 2014015506 A2 | 8/2014 |
| WO | 2015164234 A1 | 10/2015 |
| WO | 2015200201 A1 | 12/2015 |

OTHER PUBLICATIONS

Yayue Pan, Chi Zhou, Yong Chen, A Fast Mask Projection Stereolithography Process for Fabricating Digital Models in Minutes, Journal of Manufacturing Science and Engineering, Oct. 2012, 134 (5), ASME.

Ho Seop Eom, Photopolymerizations of Multicomponent Epoxide and Acrylate/Epoxide Hybrid Systems for Controlled Kinetics and Enhanced Material Properties, May 2011, University of Iowa, Iowa, USA.

Timothy J. White, William B. Liechty, C. Allan Guymon, Copolymerization of N-Vinyl Pyrrolidinone with Multifunctional Acrylates, RadTech e/5 Technical Proceedings, 2006, Radtech.

Elizabeth A. Dhulst, William H. Heath, John M. Torkelson, Hybrid thiol-acrylate-epoxy polymer networks: Comparison of one-pot synthesis with sequential reactions and shape memory properties, Polymer, Jul. 25, 2016, 198-204, 96 (100), Elsevier Ltd.

Jean Pierre Fouassier, Jacques Lalevee, Photochemical Production of Interpenetrating Polymer Networks; Simultaneous Initiation of Radical and Cationic Polymerization Reactions, Polymers, Oct. 20, 2014, 2588-2610, 6 (10), MDPI AG, Basel, Switzerland.

Jingjing Wang, Fuqian Sun, Xinsong Li, Preparation and Antidehydration of Interpenetrating Polymer Network Hydrogels Based on 2-hydroxyethyl Methacrylate and N-vinyl-2-pyrrolidone, Journal of Applied Polymer Science, Mar. 29, 2010, 1851-1858, 117 (3), Wiley Periodicals, Inc.

Christian Heller, Martin Schwentenwein, Guenter Russmueller, Franz Varga, Juergen Stampfl, Robert Liska, Vinyl Esters: Low Cytotoxicity Monomers for the Fabrication of Biocompatible 3D Scaffolds by Lithography Based Additive Manufacturing, Journal of Polymer Science Part A Polymer Chemistry, Nov. 5, 2009, 6941-6954, 47 (24), Wiley Periodicals, Inc.

Jung-Dae Cho, Jin-Who Hong, UV-Initiated Free Radical and Cationic Photopolymerizations of Acrylate/Epoxide and Acrylate/Vinyl Ether Hybrid Systems with and without Photosensitizer, Journal of Applied Polymer Science, Feb. 29, 2004, 1473-1483, vol. 93, Wiley Periodicals, Inc.

Katherine Dean, Wayne D. Cook, Effect of Curing Sequence on the Photopolymerization and Thermal Curing Kinetics of Dimethacrylate/Epoxy Interpenetrating Polymer Networks, Macromolecules, Sep. 6, 2002, 7942-7954, 35 (21), American Chemical Society, Victoria, Australia.

Jian Ping Gong, Yoshinori Katsuyama, Takayuki Kurokawa, Yoshihito Osada, Double-Network Hydrogels with Extremely High Mechanical Strength, Advanced Materials, Jul. 17, 2003, 15 (14), Wiley-VCH Verlag GmbH & Co. KGaA, Weinheim, Germany.

Saika Ahmed, Tasuku Nakajima, Takayuki Kurokawa, MD. Anamul Haque, Jian Ping Gong, Brittle-ductile transition of double network hydrogels: Mechanical balance of two networks as the key factor, Polymer, Jan. 6, 2014, 914-923, 55 (3), Elsevier B.V.

* cited by examiner (a) (b)

(a) (b)

FABRICATION OF SOLID MATERIALS OR FILMS FROM A POLYMERIZABLE LIQUID

CROSS-REFERENCE TO RELATED APPLICATIONS

This application is a continuation of International Application PCT/US2018/026858, filed on Apr. 10, 2018, which claims priority to U.S. patent application Ser. No. 15/698,059, filed on Sep. 7, 2017 and issued as U.S. Pat. No. 10,239,255 on Mar. 26, 2019, which claims the benefit of U.S. Provisional Patent Application No. 62/484,103, filed on Apr. 11, 2017, and U.S. Provisional Patent Application No. 62/484,644, filed on Apr. 12, 2017.

The entire contents of the above applications are incorporated herein by reference.

FIELD

The present disclosure relates to materials and methods for the fabrication of solid materials or films from liquid materials, and objects so produced. More specifically, the present disclosure relates to a single reaction mechanism, energy polymerizable materials designated as Photoplastics.

BACKGROUND

Single reaction mechanism, energy polymerizable resins, when hardened, generally have poor mechanical properties when compared to traditional thermoplastics. This is a primary reason that thermoplastic materials dominate many of the materials found and relied upon in production environments. Specifically, the toughness of thermoplastic materials, which includes both impact strength, elongation and tensile strength, are many times an order of magnitude higher or more than single reaction mechanism, energy polymerized materials. Generally, energy initiated reaction mechanism is free radical polymerization, although it may also be cationic polymerization. For most applications, polymerization occurs under ambient conditions (25 C, 1 atm). There are four aspects of single reaction mechanism polymerization that have been known to limit mechanical properties:

1) Linear polymers are crucial for creating very tough, high strength and high elongation thermoplastics such as Polyethylene, Polypropylene, PET, Polycarbonate, Nylon, etc. The backbone structure of these widely used thermoplastic polymers are rich with repeating units sometimes containing high strength structures with the ability to stack, align and weakly bond between chains, and/or small side chains or branches off the primary chain, which generally do not significantly interfere in chain entanglement or inter-chain mobility. With energy initiated free radical polymerization, the most common reaction mechanism to create linear polymers is with monofunctional monomers; however, these reactions are typically done in ambient air and chain termination, due to inhibition such as the dissolved oxygen, causes chain length to be much shorter than their thermoplastic counter parts. Also, these linear polymers are purely carbon backbone chains, with low entanglement and larger side chains. These features do not allow many of the beneficial weak force interactions observed in the thermoplastic polymers mentioned above, which results in materials with low toughness.

2) The speed of free radical polymerization creates very low molecular weight polymers compared to the traditional polymers mentioned above. In single reaction mechanism, energy polymerization, using a Difunctional or higher functional monomer results in nonlinear chains, with high cross link density. Although very high or even infinite molecule weight, these highly crosslinked systems are generally very high strength but also very low elongation due to the inability for polymer chains to move within the network, because of the cross-linking and high density of covalent bonds. Therefore, once again, monofunctional monomers are used to create linear polymers. Polymerization of these monomers occurs in three steps: initiation, propagation and termination. Due to both or either the energy received by the system during polymerization, the amount of initiator used or inhibition, the propagation step of the above process is generally severely shortened. One reason for shortened propagation is the instability of generated free radicals which can react with O2 or other chemical inhibitors causing chain termination. Another reason is due to the vitrification that occurs during the curing, which limits molecular mobility, which in turn limits conversion percentage. Therefore, the number of repeat units in single reaction mechanism, energy polymerized monofunctional systems is significantly lower than thermoplastic materials. This low molecule weight is known to cause significantly lower strength materials due to much lower entanglement between linear chains.

3) One of the ways to attempt to circumvent many of the problems stated above is the usage of high molecule weight, generally multifunctional, energy polymerizable oligomers. These oligomers provide much higher starting molecule weight materials, from which the crosslink density of the final material is lower and the overall chain molecular weight is much higher. However, these high molecular weight oligomers are very high in viscosity, which severely limits their ability to be used in viscosity restrictive applications such as Inkjet Printing or Additive Manufacturing.

4) Finally, in Energy initiated free radical polymerization, it has been shown to be very difficult to control the polymerization mechanism and polymerization rates of different free radical induced reactive functional group chemical species. To achieve the desirable rapid polymerization rates, there is a tradeoff between either using high energy curing or a high percentage of photoinitiators. Either of these will intrinsically cause chain termination and low molecular weight Therefore, it is very challenging to control the system on a molecular level, which leads to inconsistent building of molecular weight, crosslink density distribution, polymer network creation, conversion percentage, chain termination, individual molecular species reaction kinetics, etc. which can be seen in wide Glass Transition (Tg) temperature distributions in final products and inconsistent mechanical properties.

Ink jet inks, used for printing on a film on a substrate or for material jetting in additive manufacturing, requires a very low viscosity, typically less than about 20 centipoise at the jetting temperature. While hot melt inks have been used, liquid inks are generally more suited to high volume industrial printing. Single reaction mechanism, energy polymerizable inks use low viscosity reactive materials to attain the desired viscosity. The reactive materials have reactive groups that are polymerized after printing with radiation, such as UV radiation or electron beams. The low viscosity reactive materials in single reaction mechanism, energy polymerizable inks generally include low viscosity monomers and possibly, a low percentage of low viscosity oligomers. The single reaction mechanism, energy polymerizable inks may also include a small percentage of higher viscosity reactive and unreactive oligomers and polymers. Because monofunctional monomers are particularly low in viscosity, ink jet inks to date have included substantial amounts of monofunctional monomers. As mentioned above, these monofunctional monomers, when polymerized, generally result in low performance mechanical properties of the final material.

In conventional additive or three-dimensional fabrication techniques, construction of a three-dimensional object is performed in a step-wise or layer-by-layer manner. In particular, layer formation is generally performed through solidification of photopolymerizable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction is moved away from the bottom plate in the fabrication well. While such "bottom up" techniques hold the potential to eliminate the need for a deep well in which the object is submerged by instead lifting the object out of a relatively shallow well or pool. A constraint with both of these additive techniques is also viscosity, as the fluid with a viscosity less than 2000 cPs is generally required to for consistent layers at the top or bottom interface. Additionally, the methods of the bottom up technique are preferential to a more rigid material to ensure consistent layer-layer placement and surface finish of the final part. Finally, pot life stability is crucial for all techniques, as polymerization that can occur in the absence of energy initiation can cause part defect or even worse, the entire vat to solidify. Examples of such reactions include many of the dual reaction mechanism materials provided by Carbon 3D, such as the CE220, CE221, EPU 40, EPX 81, FPU 50, RPU 60, RPU 61 and RPU 70.

Accordingly, there is a need for new materials and methods for Inkjet Printing or producing three-dimensional objects by additive manufacturing that have satisfactory mechanical properties, along with a single polymerization mechanism which improves the pot-life shelf stability, reduces the toxicity of unpolymerized material and/or eliminate time of a thermal post cure.

SUMMARY

According to several aspects, a free radical polymerizable liquid for forming a three-dimensional object, the free radical polymerizable liquid including: a reactive oligomer, the reactive oligomer being at least one of (i) a multi-functional methacrylate oligomer, and (ii) a multi-functional acrylate oligomer and a reactive monofunctional monomer, the reactive monofunctional monomer being at least one of (i) a monofunctional N-vinyl monomer, (ii) a monofunctional vinyl ether monomer, (iii) a monofunctional vinyl ester monomer, (iv) a monofunctional vinylamide monomer, (v) a styrene monomer, (vi) a monofunctional acrylamide monomer, (vii) a monofunctional (meth)acrylate monomer, (viii) a cyanoacrylate monomer, (ix) a monofunctional vinyl carbonate monomer, (x) a monofunctional acryloyl monomer, and (xi) a monofunctional vinyl carbamate monomer. A molar bond ratio of the reactive ethylenically unsaturated groups of the reactive monofunctional species to the reactive ethylenically unsaturated groups of the reactive multi-functional species is at least 10:1. The free radical polymerizable liquid is an energy polymerizable liquid hardenable by a single reaction mechanism forming a photoplastic material.

In an additional embodiment of the present disclosure, the polymerizable liquid includes a photoinitiator from about 0.01 percent to about 15 percent by weight.

In another embodiment of the present disclosure, the polymerizable liquid has a toughness equal to or greater than a utilization curve defined by the expressions: 1) ultimate tensile strength (MPa)=−0.75×elongation+130 for elongations from about 15% to about 95%, 2) ultimate tensile strength (MPa)=4500/(elongation−25)−5 for elongations from about 95% to about 500%.

In another embodiment of the present disclosure, the polymerizable liquid has a toughness equal to or greater than a utilization curve defined by the expressions: 1) ultimate tensile strength (MPa)=−1×elongation+120 for elongations from less than 105%, 2) ultimate tensile strength (MPa)=2000/(elongation+10)−3 for elongations from about 105% to about 550% 3) ultimate tensile strength (MPa)=0.5 for elongations greater than about 550%.

In another embodiment of the present disclosure, the polymerized material reaches prescribed mechanical properties without supplied heat.

In another embodiment of the present disclosure, the polymerizable liquid includes at least one of a non-reactive light absorbing pigment in an amount from about 0.001 percent to about 10 percent by weight, a filler, a polymerization inhibitor, and a polymerization catalyst.

In another embodiment of the present disclosure, the polymerizable liquid includes a non-reactive light absorbing pigment in an amount from about 0.001 percent to about 10 percent by weight, and a filler.

In another embodiment of the present disclosure, the oligomer and the monomer react by a same polymerization mechanism and have different reaction rates.

In another embodiment of the present disclosure, the solubility of the monomer and oligomer change during polymerization, which assists homopolymerization of either the monomeric or oligomeric species.

In another embodiment of the present disclosure, polymerization creates a material with more than one glass transition temperature.

In another embodiment of the present disclosure, polymerization creates a material with two different glass transition temperatures, with a difference in Tg by at least 60 degrees C.

In another embodiment of the present disclosure, the molar bond ratio of the reactive ethylenically unsaturated groups of the reactive monofunctional species to the reactive ethylenically unsaturated groups of the reactive multi-functional species is at least 25:1.

In another embodiment of the present disclosure, the molar bond ratio of the reactive ethylenically unsaturated groups of the reactive monofunctional species to the reactive ethylenically unsaturated groups of the reactive multi-functional species is at least 30:1.

In another embodiment of the present disclosure, the polymerizable liquid forms a print on a substrate.

In another embodiment of the present disclosure, the polymerizable liquid is hardened to form a film or three-dimensional object by stereolithography (SLA), digital light projection (DLP), material jetting, or inkjet printing.

In another embodiment of the present disclosure, the thickness of the inkjet film or the 3D printed layer is greater than about 30 um.

In another embodiment of the present disclosure, when hardened the polymerizable liquid has adjustable mechanical properties resulting from changing the energy polymerization conditions.

In another embodiment of the present disclosure, the polymerizable liquid is non-toxic.

In another embodiment of the present disclosure, the oligomer has a molecular weight greater than about 1500 grams/mole.

In another embodiment of the present disclosure, the oligomer has a molecular weight greater than about 4000 grams/mole.

In another embodiment of the present disclosure, the monomer is a mono-functional N-vinyl, vinyl ester, or acryloyl selected from the group consisting of N-Vinylpyrrolidone, N-Vinylcaprolactam, N-Vinylformamide, Acryloyl morpholine or Vinyl cinnamate.

According to several aspects, a method for forming a polymerizable liquid includes mixing together a reactive oligomer, the reactive oligomer being at least one of (i) a 1 or more functional N-vinyl oligomer, (ii) a 1 or more functional vinyl ether oligomer, (iii) a 1 or more functional vinyl ester oligomer, (iv) a 1 or more functional vinylamide oligomer, (v) a styrene oligomer, (vi) a 1 or more functional acrylamide oligomer, (vii) a 1 or more functional (meth)acrylate oligomer having a different reaction speed than the 1 or more functional (meth)acrylate monomer, (viii) a cyanoacrylate oligomer, (ix) a 1 or more functional vinyl carbonate oligomer, and (x) a 1 or more functional acryloyl oligomer, (xi) 1 or more functional vinyl carbamate oligomer; and a reactive monomer, the reactive monomer being at least one of (i) a 1 or more functional N-vinyl monomer, (ii) a 1 or more functional vinyl ether monomer, (iii) a 1 or more functional vinyl ester monomer, (iv) a 1 or more functional vinylamide monomer, (v) a styrene monomer, (vi) a 1 or more functional acrylamide monomer, (vii) a 1 or more functional (meth)acrylate monomer of having a different reaction speed than the 1 or more functional (meth)acrylate oligomer, (viii) a cyanoacrylate monomer, (ix) a 1 or more functional vinyl carbonate monomer, (x) a 1 or more functional acryloyl monomer, and (xi) 1 or more functional vinyl carbamate monomer. The polymerizable liquid is an energy polymerizable liquid hardenable by a single reaction mechanism to form a Photoplastic material.

In an additional embodiment of the present disclosure, the polymerizable liquid is hardened to produce a film or three-dimensional object by stereolithography (SLA), digital light projection (DLP), material jetting (Inkjet Printing in 3D), or inkjet printing.

In another embodiment of the present disclosure, the film or three-dimensional object is a medical device or part of footwear or part of soft robotics.

In another embodiment of the present disclosure, the film or three-dimensional object is a hydrogel.

In another embodiment of the present disclosure, pixel or voxel polymerization is employed to produce different physical properties by altering the energy polymerization conditions.

In another embodiment of the present disclosure, the method further includes irradiating the polymerizable liquid with patterned irradiation.

In another embodiment of the present disclosure, the method further includes mixing in a photoinitiator in an amount from about 0.01 percent to about 15 percent by weight.

According to several aspects, an article includes an energy polymerizable liquid hardened by a single reaction mechanism forming a Photoplastic material. The energy polymerizable liquid is made from a reactive oligomer, the reactive oligomer being at least one of (i) a 1 or more functional N-vinyl oligomer, (ii) a 1 or more functional vinyl ether oligomer, (iii) a 1 or more functional vinyl ester oligomer, (iv) a 1 or more functional vinylamide oligomer, (v) a styrene oligomer, (vi) a 1 or more functional acrylamide oligomer, (vii) a 1 or more functional (meth)acrylate oligomer having a different reaction speed than the 1 or more functional (meth)acrylate monomer, (viii) a cyanoacrylate oligomer, (ix) a 1 or more functional vinyl carbonate oligomer, and (x) a 1 or more functional acryloyl oligomer, (xi) 1 or more functional vinyl carbamate oligomer; and a reactive monomer, the reactive monomer being at least one of (i) a 1 or more functional N-vinyl monomer, (ii) a 1 or more functional vinyl ether monomer, (iii) a 1 or more functional vinyl ester monomer, (iv) a 1 or more functional vinylamide monomer, (v) a styrene monomer, (vi) a 1 or more functional acrylamide monomer, (vii) a 1 or more functional (meth)acrylate monomer of having a different reaction speed than the 1 or more functional (meth)acrylate oligomer, (viii) a cyanoacrylate monomer, (ix) a 1 or more functional vinyl carbonate monomer, (x) a 1 or more functional acryloyl monomer, and (xi) 1 or more functional vinyl carbamate monomer.

In an additional embodiment of the present disclosure, when hardened the polymerizable liquid has adjustable mechanical properties by changing the energy polymerization conditions.

Further, the present disclosure provides a method of forming a solid Photoplastic material through a single reaction mechanism, comprising: (i) an energy polymerizable liquid first component, and (ii) a second energy polymerizable liquid component different from the first component; wherein these components are combined and then Energy irradiated to polymerize and form a solid Photoplastic material.

In some embodiments, the reactive diluent comprises an acrylate, a methacrylate, a styrene, an acrylic acid, a vinylamide, a vinyl ether, a vinyl ester (including derivatives thereof), polymers containing any one or more of the foregoing, and combinations of two or more of the foregoing. (e.g., acrylonitrile, styrene, divinyl benzene, vinyl toluene, methyl acrylate, ethyl acrylate, butyl acrylate, methyl(meth)acrylate, amine(meth)acrylates as described above, and mixtures of any two or more of these)

In some embodiments, the non-reactive polymer comprises a polymer or blend of polymers that do not have functional groups that participate in the polymerization of bulk material. Many polymers may be used, including but not limited to Polyethylene, Polypropylene, Polycarbonate, Polyvinylchloride, PET, and mixtures of any two or more of these.

In some embodiments, the first component comprises a reactive monomer or oligomer with acrylate functionality. In this embodiment, the first component preferentially or is forced to react with itself to create a homo-polymer network.

In some embodiments, the second component comprises a reactive monomer or oligomer with (meth)acrylate functionality. In this embodiment, the first component preferentially or is forced to react with itself to create a homo-polymer network.

In some embodiments, the second component comprises a reactive monomer or oligomer with N-vinyl, vinyl ether, acryloyl, vinyl carbonate, vinyl carbamate, vinyl ester, and/or vinylamide functionality. In this embodiment, the second component preferentially or is forced to react with itself to create a homo-polymer network.

In some embodiments, the first component comprises a reactive monomer or oligomer with acrylate and/or methacrylate functionality and the second component comprises a reactive monomer or oligomer with N-vinyl, vinyl ether, vinyl carbonates, vinyl carbamates, acryloyl, vinyl ester, and/or vinylamide functionality. In this embodiment, the components react with each other and themselves to create a random copolymer.

In some embodiments, the first component comprises a reactive monomer or oligomer with acrylate and/or methacrylate functionality and the second component comprises a reactive monomer or oligomer with N-vinyl, vinyl ether, vinyl carbonates, vinyl carbamates, acryloyl, vinyl ester, and/or vinylamide functionality. In this embodiment, the components react with themselves, to form a full IPN, a semi-IPN, a pseudo-IPN or a Dual Network. In some embodiments, the three-dimensional object comprises a polymer blend (e.g., an IPN, a semi-IPN, pseudo-IPN, a sequential IPN, a simultaneous IPN, Dual Network) formed from the first component and the second component.

In some embodiments, the single reaction mechanism, energy polymerizable liquid comprises from 1, 2 or 5 percent by weight to 20, 30, 40, 90 or 99 percent by weight of the first component; and from 1, 10, 60, 70 or 80 percent by weight to 95, 98 or 99 percent by weight of the second component (optionally including one or more additional components). In other embodiments, the single reaction mechanism, energy polymerizable liquid comprises from 1, 2 or 5 percent by weight to 20, 30, 40, 90 or 99 percent by weight of the second component; and from 1, 10, 60, 70 or 80 percent by weight to 95, 98 or 99 percent by weight of the first component (optionally including one or more additional components).

In some embodiments, the second component is solidified concurrently by the same light as is the first component in the same irradiating step.

In some embodiments, the second component is solidified subsequently with light at a wavelength different from that of the light in the irradiating step.

In some embodiments, the second component is solidified subsequently with light at a wavelength the same as the light in the irradiating step.

In some embodiments, the second component is solidified subsequently with an Electron Beam.

One particular embodiment of the inventions disclosed herein is a method of forming a three-dimensional object comprised of single reaction mechanism, energy polymerizable liquid thereof. The method includes providing a carrier and an optically transparent member having a build surface, the carrier and the build surface defining a build region therebetween; filling the build region with a polymerizable liquid, the polymerizable liquid comprising at least two of: a (meth)acrylate oligomer, a cyanoacrylate monomer, an acrylamide monomer, a vinyl ether monomer, a vinyl ester monomer, an N-vinyl monomer, a vinyl carbonate monomer, a vinyl carbamate monomer, an acryloyl monomer, a vinylamide monomer irradiating the build region with light through the optically transparent member to form a solid polymer scaffold and advancing the carrier away from the build surface to form a three-dimensional intermediate having the same shape as, or a shape to be imparted to, the three-dimensional object, and then energy irradiating the three-dimensional intermediate sufficiently to form from the three-dimensional intermediate, the three-dimensional object.

In some embodiments, the solidifiable or single reaction mechanism, energy polymerizable liquid is changed at least once during the method with a subsequent solidifiable or single reaction mechanism, energy polymerizable liquid; optionally where the subsequent solidifiable or single reaction mechanism, energy polymerizable liquid is cross-reactive with each previous solidifiable or single reaction mechanism, energy polymerizable liquid during the subsequent polymerization, to form an object having a plurality of structural segments covalently coupled to one another, each structural segment having different mechanical (e.g., tensile) properties.

A further aspect of the disclosure described herein is a single reaction mechanism, energy polymerizable liquid useful for the production of a film or three-dimensional object comprised of (meth)acrylate and vinyl functional resins thereof by additive manufacturing or inkjet printing. The single reaction mechanism, energy polymerizable liquid includes a mixture of: a) at least one constituent selected from the oligomer group comprising of (i) a 1 or more functional acrylate oligomer, (ii) a 1 or more functional (meth)acrylate oligomer, (iii) a 1 or more functional vinyl oligomer, b) at least one constituent with different reaction speed from (a), selected from the vinyl group comprising of (i) a 1 or more functional N-vinyl monomer, (ii) a 1 or more functional vinyl ether monomer, (iii) a 1 or more functional vinyl ester monomer, (iv) a 1 or more functional vinylamide monomer, (v) a styrene monomer, (vi) acrylamide monomer, (vii) (meth)acrylate monomer, (viii) cyanoacrylate monomer, (ix) a 1 or more functional vinyl carbonate monomer, (x) a 1 or more functional acryloyl monomer, (xi) a 1 or more functional vinyl carbamate monomer, c) one or more photoinitiators, d) optionally a reactive diluent, e) optionally a nonreactive polymer, f) optionally one or more polymerization inhibitors, g) optionally at least one non-reactive light absorbing pigment or dye which when present is included in an amount of from 0.001 to 10 percent by weight, and h) optionally a filler (e.g. silica, carbon-fiber, aluminum, a toughener such as a core-shell rubber, etc., including combinations thereof).

A further aspect of the disclosure described herein is a single reaction mechanism, energy polymerizable liquid useful for the production of a film or three-dimensional object comprised of acrylate and methacrylate functional resins thereof by additive manufacturing or inkjet printing. The single reaction mechanism, energy polymerizable liquid includes a mixture of: a) at least one constituent selected from the oligomer group comprising of a 1 or more functional acrylate oligomer, b) at least one constituent selected from the methacrylate group comprising of a 1 or more functional methacrylate monomer, c) one or more photoinitiators, d) optionally a reactive diluent, e) optionally a nonreactive polymer, f) optionally one or more polymerization inhibitors, g) optionally at least one non-reactive light absorbing pigment or dye which when present is included in an amount of from 0.001 to 10 percent by weight, and h) optionally a filler (e.g. silica, carbon-fiber, aluminum, a toughener such as a core-shell rubber, etc., including combinations thereof).

In some embodiments, single reaction mechanism energy polymerizable liquids used in the present invention include a non-reactive pigment or dye. Examples include, but are not limited to, (i) titanium dioxide (e.g., in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g. in an amount of 0.001 or 0.005 to 1, 2 or 4 percent by weight).

In some embodiments, a hindered amine light stabilizer or a Lewis acid or an oxidizable tin salt is included in the single reaction mechanism energy polymerizable liquid (e.g., in an amount of from 0.01 or 0.1 to 1 or 2 percent by weight, or more) in an amount effective to accelerate the formation of the three-dimensional intermediate object during the production thereof.

In some embodiments, a hindered amine light stabilizer or a Lewis acid or an oxidizable tin salt is included in the single reaction mechanism energy polymerizable liquid (e.g., in an amount of from 0.01 or 0.1 to 1 or 2 percent by weight, or more) in an amount effective to preferentially accelerate the polymerization of the first component, and/or the second component of the polymerizable resin.

A further aspect of the disclosure described herein is a three-dimensional object including: an energy polymerized first component, and an energy polymerized component different from the first component by reaction rate, polymerized through the same reaction mechanism as the first component, and/or the three-dimensional object is produced by the process of additive manufacturing.

A further aspect of the disclosure described herein is a three-dimensional object including: an energy polymerized first component, and an energy polymerized component different from the first component by solubility prior to polymerization, polymerized through the same reaction mechanism as the first component, and/or the three-dimensional object is produced by the process of additive manufacturing.

A further aspect of the inventions disclosed herein is a three-dimensional object including: an energy polymerized first component, and an energy polymerized component different from the first component by solubility after polymerization of the first component. Both components are polymerized through the same reaction mechanism and/or the three-dimensional object is produced by the process of additive manufacturing. If the solubility of the components within each other change during polymerization, phase separation may drive homopolymerization of either component and change the refractive index of the material.

A further aspect of the disclosure described herein is a three-dimensional object including: an energy polymerized first component, and an energy polymerized component different from the first component by a molar bond ratio of 500% (5:1 or higher molar bond ratio of Component 2: Component 1), polymerized through the same reaction mechanism as the first component, and/or the three-dimensional object is produced by the process of additive manufacturing.

A further aspect of the disclosure described herein is a three-dimensional object including: an energy polymerized first component, and an energy polymerized component different from the first component by a molar bond ratio of 700% (7:1 or higher molar bond ratio of Component 2: Component 1), polymerized through the same reaction mechanism as the first component, and/or the three-dimensional object is produced by the process of additive manufacturing.

In some embodiments, the object further includes a third solidified (or further reacted, polymerized, or chain extended) component different from the first and second component, with the object having at least a first structural segment and a second structural segment covalently coupled to one another, the first structural segment comprised of the second solidified component, the second structural segment comprised of the third solidified component; and both the first and second structural segments comprised of the same or different light polymerized first component.

In some embodiments, the object comprises a polymer blend formed from the first component and the second component.

The object may be one that has a shape that cannot be formed by injection molding or casting.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
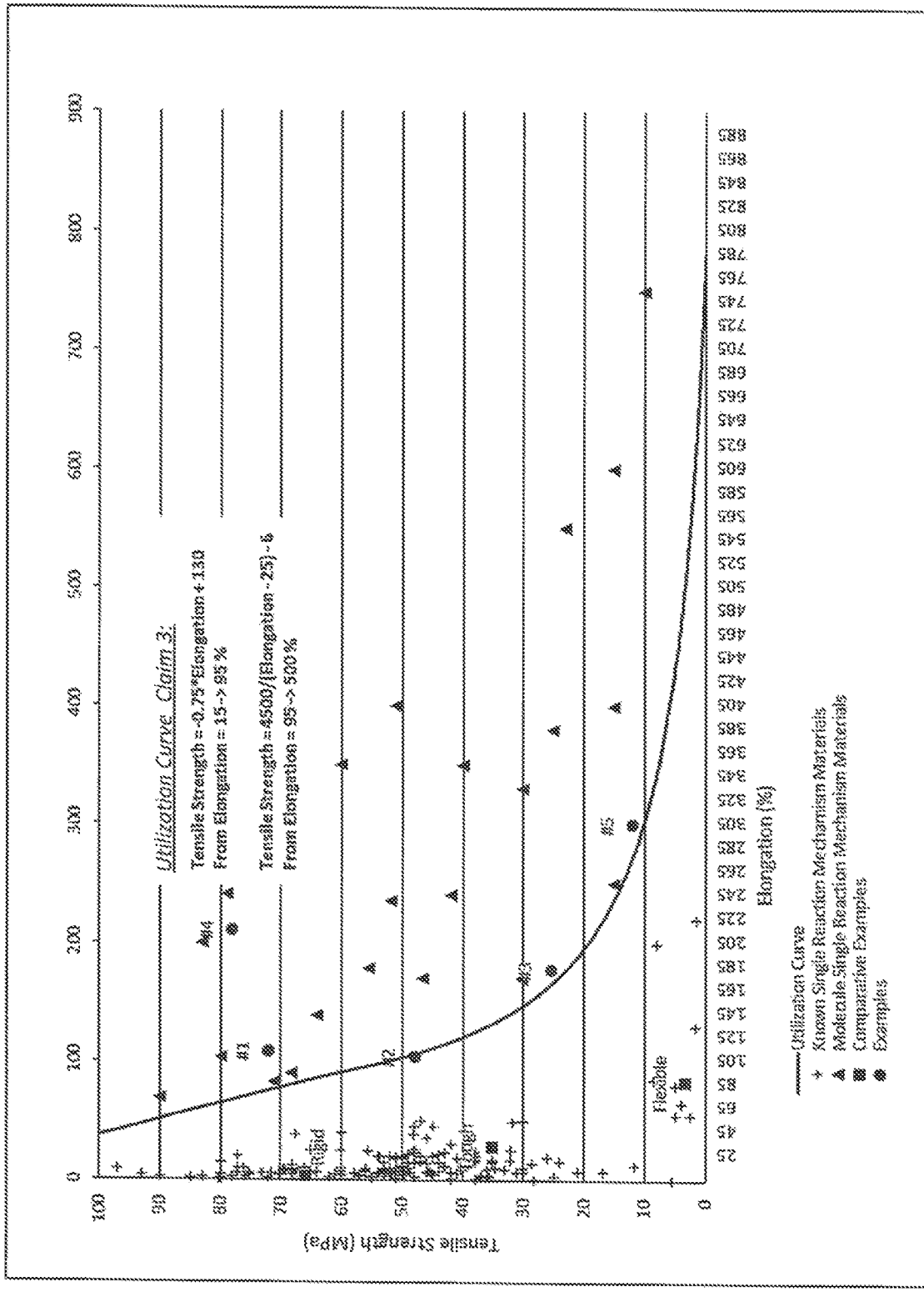
FIG. 1A is a plot of a single reaction mechanism, energy polymerizable polymers in accordance with the principles of the present invention.

The following description is merely exemplary in nature and is not intended to limit the present disclosure, application, or uses.

The present invention is now described more fully with reference to the accompanying drawings. Like numbers refer to like elements throughout. In the figures, the thickness of certain lines, layers, components, elements or features may be exaggerated for clarity. Where used, broken lines illustrate optional features or operations unless specified otherwise.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product). As noted above, the three-dimensional intermediate may also be washed, if desired, before further Polymerizing, and/or before, during, or after any intervening forming steps.

The polymerized material may reach prescribed mechanical properties without supplied heat. Alternatively, the polymerized material may be heated. Heating may be active heating (e.g., in an oven, such as an electric, gas, or solar oven), or passive heating (e.g., at ambient temperature). Active heating will generally be more rapid than passive heating and in some embodiments, is preferred, but passive heating—such as simply maintaining the intermediate at ambient temperature for a sufficient time to effect further polymerization—is in some embodiments preferred.

A voxel represents a value on a regular grid in three-dimensional space. As with pixels in a bitmap, voxels themselves do not typically have their position (their coordinates) explicitly encoded along with their values. Instead, the position of a voxel is inferred based upon its position relative to other voxels (i.e., its position in the data structure that makes up a single volumetric image). In contrast to pixels and voxels, points and polygons are often explicitly represented by the coordinates of their vertices. A direct consequence of this difference is that polygons are able to efficiently represent simple 3D structures with significant empty or homogeneously filled space, while voxels are good at representing regularly sampled spaces that are non-homogeneously filled.

An oligomer is a molecular complex that consists of a few monomer units, in contrast to a polymer, where the number of monomers is, in principle, not limited. Dimers, trimers, and tetramers are, for instance, oligomers composed of two, three and four monomers, respectively.

Single reaction mechanism energy polymerization, Single reaction mechanism energy polymerizable, Single reaction mechanism energy polymerized, Single reaction mechanism energy Polymerizing, Single reaction mechanism energy Irradiating, or Single reaction mechanism energy Irradiated refer to an induction of polymerization by either actinic radiation, UV light, Visible light or electron(s). Such examples include UV light (100 nm-405 nm), Visible Light (405 nm-700 nm) or Electron beam. A non-comprehensive list of example light sources for carrying out the present invention include LEDs, laser diodes, laser beams, lamps (halogen lamp, Xe, Xe—Hg lamps, etc.), LED Lasers or LED projectors used in additive manufacturing, Visible light irradiating LCD, LED or Plasma screens, mobile or tablet devices. This polymerization then is carried out through a single reaction mechanism, such as free radical, cationic, Michael addition, step-growth, click-chemistry, etc.

Photoplastic is a material formed by a method of energy polymerization of a single reaction mechanism liquid material. Compared to existing photopolymers, Photoplastics have mechanical properties that are comparable to materials known as thermoplastics, shown, for example in FIG. 1A, FIG. 1B, FIG. 1C and FIG. 2. Photoplastics may display physical and mechanical properties superior or comparable to high performance thermoplastics such as Nylon 6, Polycarbonate, PET, Polypropylene, Polyethylene, and a wide range of thermoplastic copolymers. In addition, Photoplastics may display physical and mechanical properties superior or comparable to other high performance rubbers such as silicone and vulcanized natural rubber. Photoplastics can take the form of a variety of polymer networks, including but not limited to Interpenetrating Networks and random copolymer networks.

Figure 3:
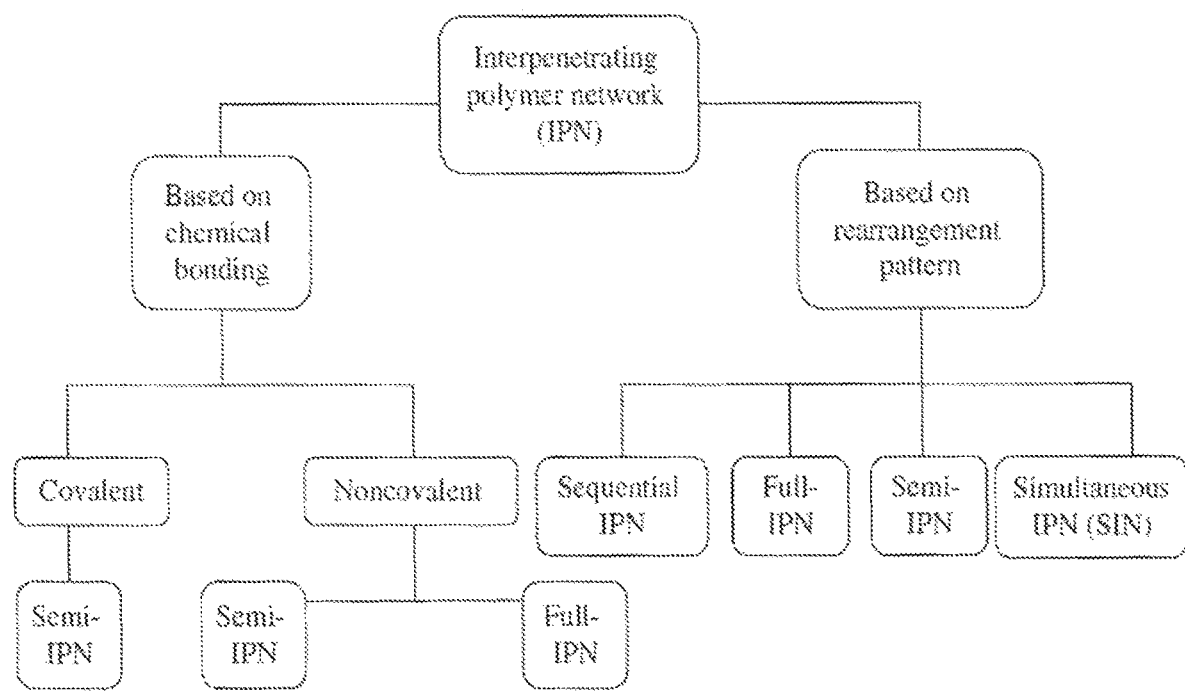
FIG. 3 illustrates classifications of IPNs in accordance with the principles of the present invention.

Interpenetrating Networks. Interpenetrating Network or Interpenetrating Networks or Interpenetrating Polymer Network or Interpenetrating Polymer Networks or IPN or IPNs refer to polymers comprising two or more networks which are at least partially interlaced on a polymer scale but not necessarily covalently bonded to each other. These IPNs can take multiple forms in these embodiments: Full, semi, or pseudo. In some embodiments, these networks may be referred to as Dual Networks (DN). Finally, some embodiments may use either or both a sequential or simultaneous process to build these networks. Examples of different classifications of IPNs are shown in FIG. 3.

The interpenetrating polymer network (IPN) is a method utilized in polymer science when composite materials are prepared from two immiscible or miscible starting materials. The final product consists of two networks independently cross-linked by chemical or physical bonds. In such a system, the two phases are each continuous in space, such that each contact all portions of the sample space.

Figure 4:
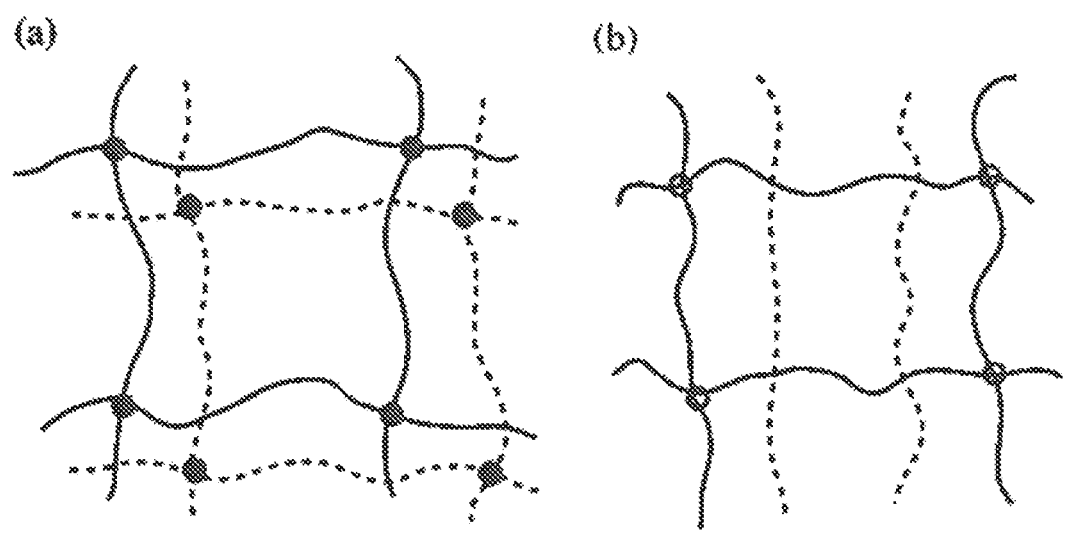
FIG. 4 illustrates (a) full-IPN and (b) semi-IPN, respectively (solid lines=one polymer network, dashed lines=secondary polymer network) in accordance with the principles of the present invention.

Full and semi-IPNs depend on whether one or both respective components are cross-linked, as shown in FIG. 4. Defined herein less than 1% cross-linking is a full IPN network, while partial crosslinking from 1% to 99% is a semi-IPN network. Semi-IPNs contain linear and/or branched networks that may be separated. Pseudo IPNs have polymer chains that have grown and filled internal pores of an existing structure or network.

Figure 5:
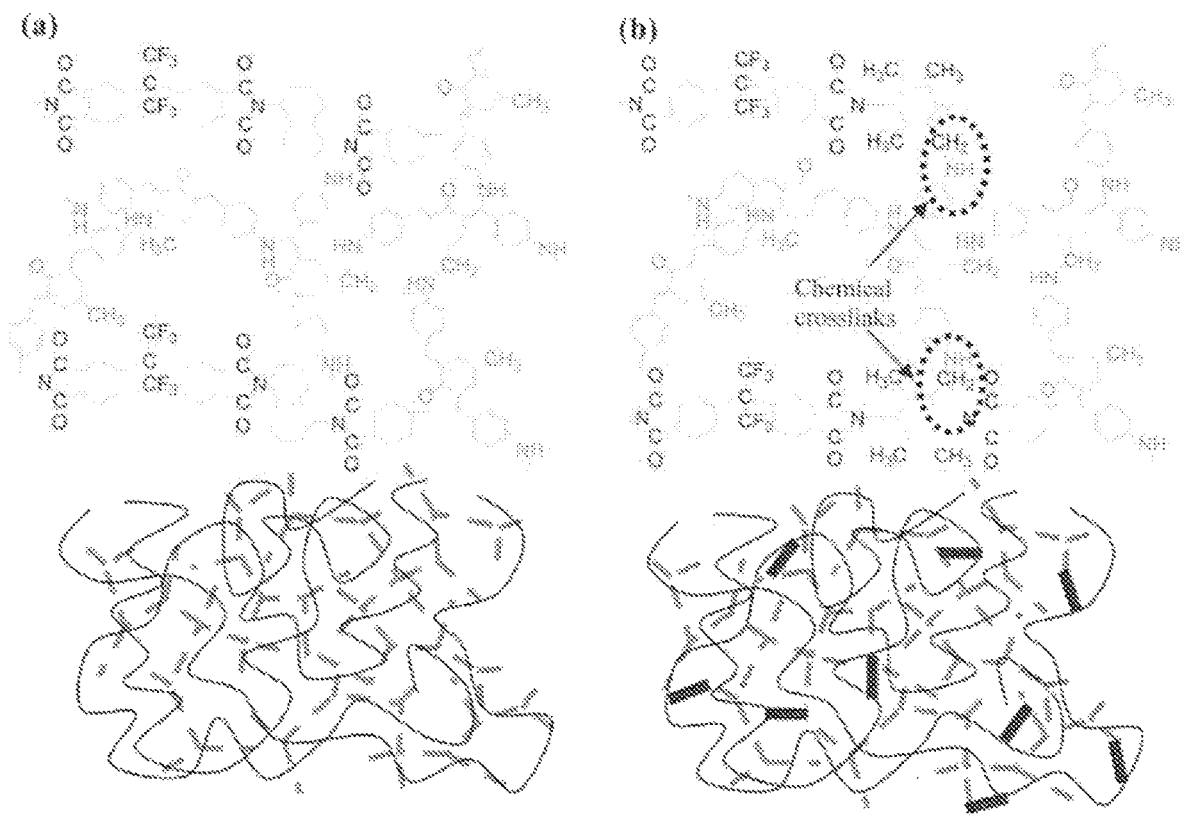
FIG. 5 illustrates (a) pseudo-IPN after polymerization of a two or more component polymerizable resin, that is, two entangled networks, with the possibility of weak bonding between the networks and (b) a pseudo-IPA after polymerization of a two or more component polymerizable resin, that is, two entangled networks, with covalent chemical crosslinks between the networks in accordance with the principles of the present invention.

Pseudo-IPN's, seen in FIG. 5 can be a special category of rotaxanes which are usually partially or fully phase-separated because the linear chains are thermodynamically incompatible with a crosslinked component and usually possess sufficient molecular mobility to undergo spontaneous phase separation.

Figure 6:
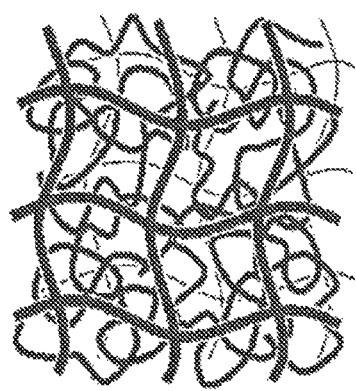
FIG. 6 illustrates a dual network with contrasting structure after polymerization of two or more component polymerizable resin, the two networks not having internetwork chemical bonds, the chemical structures of PAMPS and PAAm being examples that can form such structure in accordance with the principles of the present invention.
Figure 6:
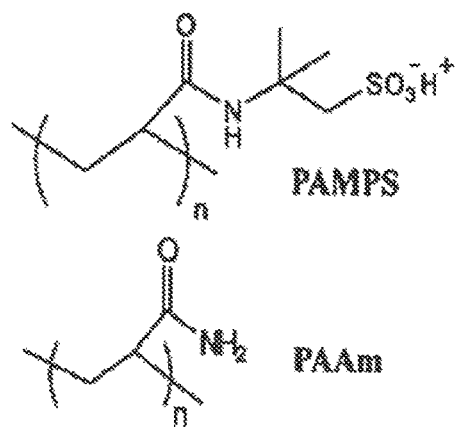

Dual networks (DN), seen in FIG. 6, are known to be different than full, semi or pseudo-IPNs in concept. An IPN can combine various physical and chemical properties such as adhesion to cells, water-absorbing ability, biocompatibility, biodegradability, etc; without any notable improvement in mechanical strength in comparison to their original single-network structure. DN gel differ from fiber-reinforced hydrogel, which consists of a mechanically tough "dry" component (hydrophobic plastics) and mechanically weak "wet" component (hydrophilic gel), in that the mechanical properties of the composite are basically determined by the tough "dry" component while the hydrophilic component behaves as a water absorber, playing practically no role in improving the mechanical strength. The high strength of the DN gels is not due to a linear combination of two component networks, like the common IPN or fiber-reinforced hydrogels but due to a nonlinear effect of the binary structure. Although both of the two individual networks are mechanically weak, that is, the first one is stiff and brittle and the second soft and ductile, their combined DN gels are stiff but not brittle, ductile but not soft.

Figure 7:
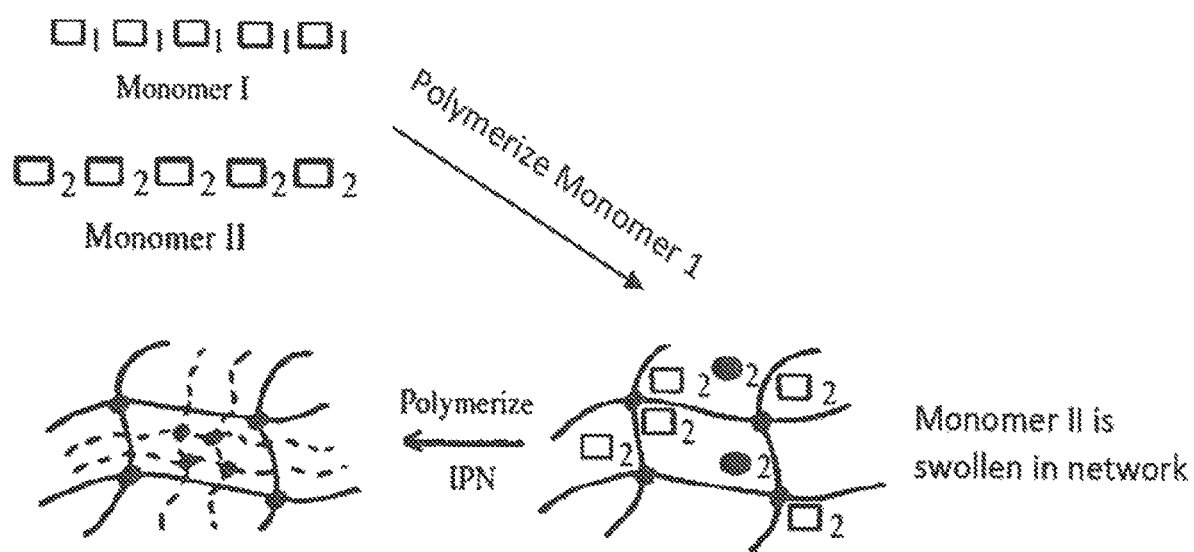
FIG. 7 is a flow diagram illustrating the formation of a sequential IPN, after polymerization of a two or more component polymerizable resin (solid lines=one polymer network, dashed line=secondary polymer network in accordance with the principles of the present invention.
Figure 8:
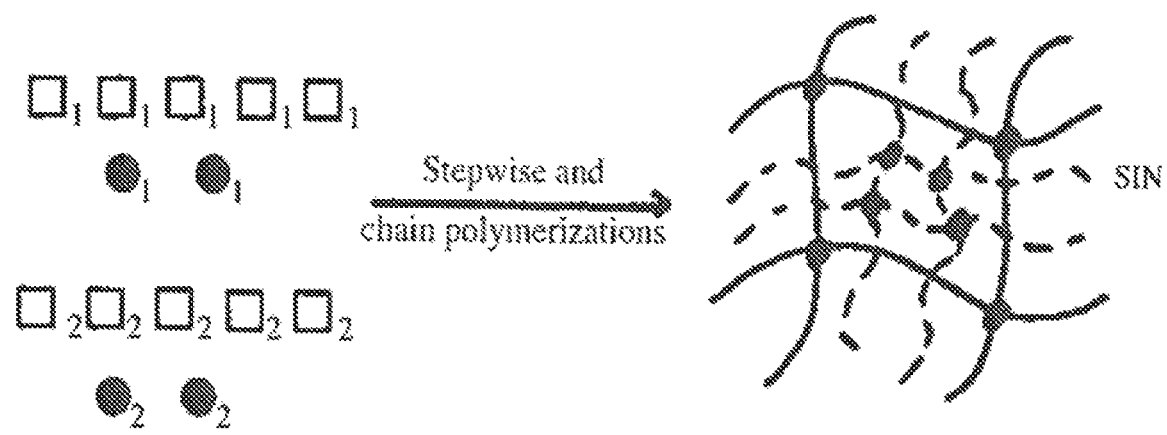
FIG. 8 is a flow diagram illustrating the formation of a simultaneous IPN, after polymerization of a two or more component polymerizable resin (solid lines=one polymer network, dashed lines=secondary polymer network, open square and solid circles=different monomers) in accordance with the principles of the present invention.
Figure 9A:
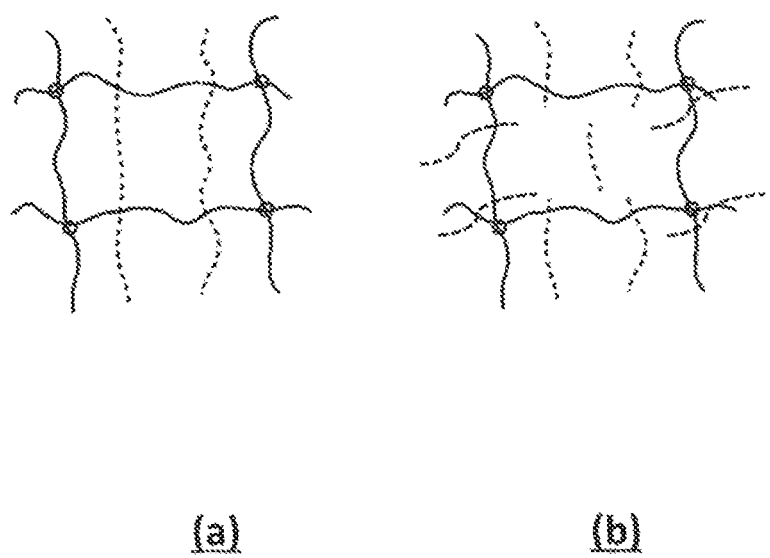
FIG. 9A illustrates different molecular weight control of IPN network for (a) long networks and (b) short networks (solid lines=cross-linked polymer network, dashed lines=secondary monomer polymer network) in accordance with the principles of the present invention.
Figure 9B:
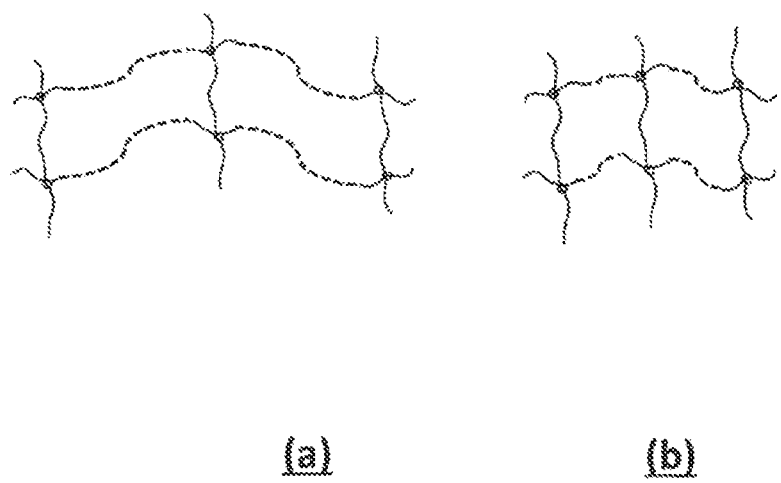
FIG. 9B illustrates different molecular weight control of monomer segments of a random copolymer for (a) long networks and (b) short networks (solid lines=cross-linked polymer network, dashed lines=secondary monomer polymer network) in accordance with the principles of the present invention.
Figure 9C:
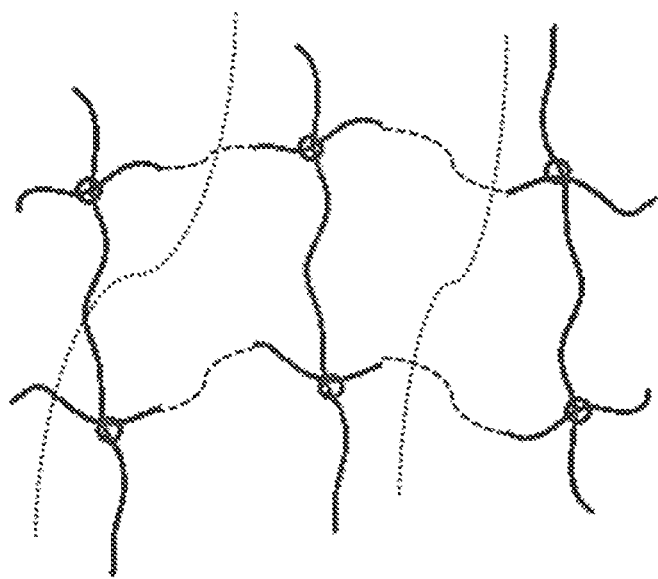
FIG. 9C illustrates a chain extend scaffolding IPN network with a monomer (solid lines=cross-linked network 1, long dashed lines=chain extended with monomer, short dashed lines=secondary monomer network, which may or may not be the same monomer as the chain extended monomer) in accordance with the principles of the present invention.
Figure 9D:
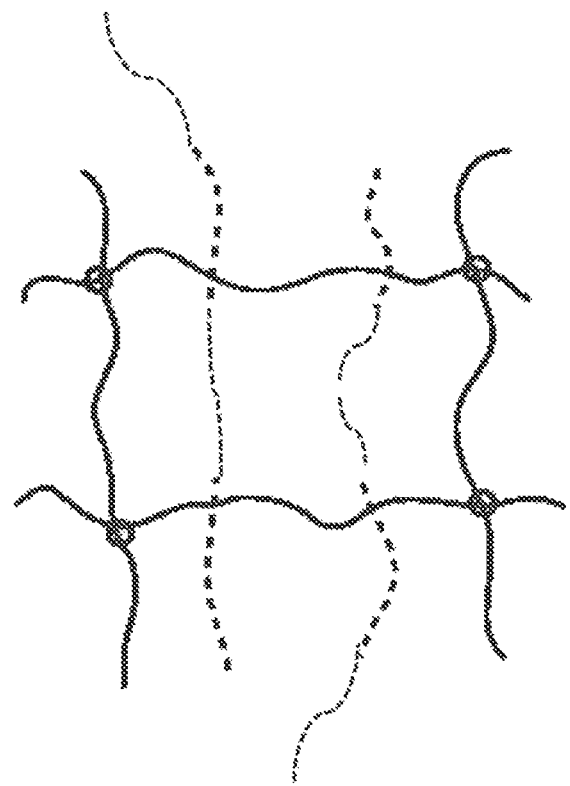
FIG. 9D illustrates a chain extended secondary network with a monomer (solid lines=cross-linked network 1, long dashed lines=chain extended monomer network, short dashed lines=secondary monomer network which is a different monomer from the chain extended monomer) in accordance with the principles of the present invention.

An interpenetrating polymer network such as these can be obtained either by a simultaneous method, shown in FIG. 8, in which all the chemicals are mixed together and allowed to react at the same time, or by a sequential technique, shown in FIG. 7. Sequential polymerization may occur in steps, where a premixed resin will have some components polymerize in a first step, with the scaffold network now swollen with unpolymerized material, which polymerizes in a later step. Alternatively, sequential network polymerization could rely on the swelling of a presynthesized network in a solution containing the second polymer to be cross-linked. In the second case a high porosity of the first network can be useful in order to reach satisfactory percentages of the second polymer in the resulting composite. For this reason, in aqueous systems such as hydrogels, freeze-drying can be a suitable procedure to efficiently strip out the entrapped water leading to the formation of macroporous sponges.

The molecular weight of each network in an IPN can be controlled, as shown in FIG. 9. Different factors can be used to control the molecular weight of each networks, such as the relative ratios of each component in the system, relative ratios between components and initiator(s) and relative ratios between components and inhibitor(s). Additionally, if UV energy is used for polymerization, the wattage and the energy of the light may be used for molecular weight control.

IPN, Semi IPN, Pseudo-IPN, and Dual Networks may be detected by two distinct glass transition temperatures measured by DMA or DSC.

In some embodiments, the materials are low toxicity. Toxic materials are often used to achieve thermoplastic like properties in dual polymerization materials, which can be seen in FIG. 2. A toxic substance is a substance that can be poisonous or cause health effects. Typically, if toxic materials are ingested or breathed in by humans, they can cause physiological damage. There is general concerned about chemicals like low molecular weight amines for example, Trimethylolpropane poly(oxypropylene)triamine or 4,4'-Methylenebis(2-methylcyclohexylamine). There is also a general concern about chemicals with isocyanate functionality.

Hindered Amine Light Stabilizers useful for carrying out the present invention include, but are not limited to, derivatives of 2,2,6,6-tetramethylpiperidine, 1,6-Hexanediamine, N,N'-bis(2,2,6,6-tetramethyl-4-piperidinyl)—, polymer with 2,4,6-trichloro-1,3,5-triazine, reaction products with N-butyl-1-butanamine and N-butyl-2,2,6,6-tetramethyl-4-piperidinamine, Butanedioic acid, 1,4-dimethyl ester, polymer with 4-hydroxy-2,2,6,6-tetramethyl-1-piperidineethanol, Bis(1,2,2,6,6-pentamethyl-4-piperidinyl)sebacate+Methyl(1,2,2,6,6-pentamethyl-4-piperidinyl)sebacate, Bis (2,2,6,6-tetramethyl-4-piperidinyl)sebacate, 2,2,6,6-tetramethyl-4-piperidinyl stearate (fatty acid mixture), 1,6-Hexanediamine, N,N'-bis(2,2,6,6-tetramethyl-4-piperidinyl)—, polymer with 2,4,6-trichloro-1,3,5-triazine, reaction products with 2,4,4-trimethyl-2-pentanamine.

Oxidizable tin salts useful for carrying out the present invention include, but are not limited to, stannous butanoate, stannous octoate, stannous hexanoate, stannous heptanoate, stannous linoleate, stannous phenyl butanoate, stannous phenyl stearate, stannous phenyl oleate, stannous nonanoate, stannous decanoate, stannous undecanoate, stannous dodecanoate, stannous stearate, stannous oleate stannous undecenoate, stannous 2-ethylhexoate, dibutyl tin dilaurate, dibutyl tin dioleate, dibutyl tin distearate, dipropyl tin dilaurate, dipropyl tin dioleate, dipropyl tin distearate, dibutyl tin dihexanoate, and combinations thereof. See also U.S. Pat. Nos. 5,298,532; 4,421,822; and 4,389,514, the disclosures of which are incorporated herein by reference. In addition to the foregoing oxidizable tin salts, Lewis acids such as those described in Chu et al. in Macromolecular Symposia, Volume 95, Issue 1, pages 233-242, June 1995 are known to enhance the polymerization rates of free-radical polymerizations and are included herein by reference.

Any suitable filler may be utilized in connection with the various embodiments described herein, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, carbon-fiber, metals, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention, for example, as described in US Patent Application Publication No. 20150215430, the entire contents of which are incorporated herein by reference. The toughener may be uniformly distributed in the form of particles in the polymerized product. The particles can be less than 5 microns (um) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers described, for example in U.S. Pat. No. 6,894,113, the entire contents of which are incorporated herein by reference, and include "NANOSTRENGTH®™" SBM (polystyrene-polybutadiene-polymethacrylate), and AMA (polymethacrylate-polybutylacrylate-polymethacrylate), both produced by Arkema. Other suitable block copolymers include FORTEGRA®™ and the amphiphilic block copolymers described in U.S. Pat. No. 7,820,760, the entire contents of which are incorporated herein by reference. Examples of known core-shell particles include the core-shell (dendrimer) particles whose compositions are described in US20100280151A1 (Nguyen et al., Toray Industries, Inc., 2010) for an amine branched polymer as a shell grafted to a core polymer polymerized from polymerizable monomers containing unsaturated carbon-carbon bonds, core-shell rubber particles described, for example, in EP 1632533A1 and EP 2123711A1, the entire contents of which are incorporated herein by reference, and the "KaneAce MX" product line of such particle/epoxy blends with particles that have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer, "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include NANOPDX®™ produced by nanoresins AG. This is a master blend of functionalized nanosilica particles and an epoxy.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat.

Nos. 6,861,475, 7,625,977, 7,642,316, 8,088,245, the entire contents of which are incorporated herein by reference, and elsewhere.

In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle.

In some embodiments, the rubbery core can have a Tg of less than −25° C., more preferably less than −50° C., and even more preferably less than −70° C. The Tg of the rubbery core may be well below −100° C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material can be grafted onto the core or is cross-linked. The rubbery core may constitute from 50 to 95%, or from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized mono-unsaturated monomers such as styrene, vinyl acetate, vinyl chloride, methyl methacrylate, and the like. The core polymer is optionally cross-linked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl.

The shell polymer, which is optionally chemically grafted or cross-linked to the rubber core, can be polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer can be between 20,000 and 500,000.

One suitable type of core-shell rubber has reactive groups in the shell polymer which can react with an epoxy resin or an epoxy resin hardener. Glycidyl groups are suitable. These can be provided by monomers such as glycidyl methacrylate.

One example of a suitable core-shell rubber is of the type described in US Patent Application Publication No. 2007/0027233 (EP 1 632 533 A1), the entire contents of which are incorporated herein by reference. Core-shell rubber particles as described therein include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document. Suitable core-shell rubbers include, but are not limited to, those sold by Kaneka Corporation under the designation Kaneka Kane Ace, including the Kaneka Kane Ace 15 and 120 series of products, including Kanaka Kance Ace MX 120, Kaneka Kane Ace MX 153, Kaneka Kane Ace MX 154, Kaneka Kane Ace MX 156, Kaneka Kane Ace MX170, and Kaneka Kane Ace MX 257 and Kaneka Kane Ace MX 120 core-shell rubber dispersions, and mixtures thereof.

I. Single Reaction Mechanism Energy Polymerizable Liquids have Benefit Over Traditional IPN Systems Because the Two or More Parts can be Pre-Mixed or Combined in Liquid Form. However Here we Will Refer to the Individual Components as Part A and Part B: Part A.

Polymerization systems as described herein may include a first polymerizable system (sometimes referred to as "Part A" or herein) that is polymerizable by actinic radiation, typically light, and in some embodiments, ultraviolet (UV) light). Any suitable polymerizable liquid can be used as the first component. The liquid (sometimes also referred to as "liquid resin" "ink," or simply "resin" herein) can include a monomer or preferentially an oligomer, particularly photopolymerizable and/or free radical polymerizable monomers or oligomers, and a suitable initiator such as a free radical initiator, and combinations thereof. Examples include, but are not limited to, acrylics, methacrylics, vinyls, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968; CN 102715751; JP 2012210408, the entire contents of which are incorporated herein by reference.

Hydrogels. In some embodiments, suitable resins include photopolymerizable hydrogels like poly(ethylene glycols) (PEG) and gelatins. PEG hydrogels have been used to deliver a variety of biologicals, including Growth factors; however, a great challenge facing PEG hydrogels cross-linked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include polymerization derivatives from dyes such as Rose Bengal.

Acid catalyzed polymerizable liquids. While in some embodiments as noted above the single reaction mechanism energy polymerizable liquid includes a free radical polymerizable liquid (in which case an inhibitor may be oxygen as described below), in other embodiments the single reaction mechanism polymerizable liquid includes an acid catalyzed, or cationically polymerized, polymerizable liquid. In such embodiments, the polymerizable liquid includes monomers contain groups suitable for acid catalysis, such as epoxide groups, vinyl ether groups, etc. Thus, suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, for example, U.S. Pat. Nos. 7,824,839; 7,550,246; 7,534,844; 6,692,891; 5,374,500; and 5,017,461, the entire contents of which are incorporated herein by reference; see also *Photoacid Generator Selection Guide for the electronics industry and energy curable coatings* (BASF 2010), the entire contents of which are incorporated herein by reference.

Photopolymerizable silicone. A suitable resin includes photopolymerizable silicones. UV polymerizable silicone rubber, such as Sliopren™ UV Polymerizable Silicone Rubber can be used as can LOCTITE™ Polymerizable Silicone adhesives sealants. Applications include optical instruments, medical and surgical equipment, exterior lighting and enclosures, electrical connectors/sensors, fiber optics, gaskets, and molds.

Biodegradable resins. Biodegradable resins are particularly important for implantable devices to deliver drugs or for temporary performance applications, like biodegradable screws and stents (U.S. Pat. Nos. 7,919,162 and 6,932,930, the entire contents of which are incorporated herein by reference). Biodegradable copolymers of lactic acid and glycolic acid (PLGA) can be dissolved in PEG di(meth) acrylate to yield a transparent resin suitable for use, Polycaprolactone and PLGA oligomers can be functionalized with acrylic or methacrylic groups to allow them to be effective resins for use.

Photopolymerizable polyurethanes. A particularly useful material is photopolymerizable polyurethanes (including, polyureas, and copolymers of polyurethanes and polyureas (e.g., poly(urethane-urea)). A photopolymerizable polyurethane/polyurea composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator, and (4) an anti-oxidant, can be formulated so that it provides a hard, abrasion-resistant, and stain-resistant material (U.S. Pat. No. 4,337,130, the entire contents of which are incorporated herein by reference). Photopolymerizable thermoplastic polyurethane elastomers incorporate photoreactive diacetylene diols as chain extenders.

High performance resins. In some embodiments, high performance resins are used. Such high-performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507, 784 and 6,939,940, the entire contents of which are incorporated herein by reference. Since such resins are sometimes employed as high-temperature thermoset resins, in the present invention they further comprise a suitable photoinitiator such as benzophenone, anthraquinone, and fluoroenone initiators (including derivatives thereof), to initiate cross-linking on irradiation, as discussed further below.

Additional example resins. Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM1401V High Temperature Mold Material for use directly with vulcanized rubber in molding/casting applications. A particularly useful material for making tough and stiff parts includes EnvisionTEC's RC31 resin. Particularly useful resin for investment casting applications include EnvisionTEC's Easy Cast EC500 resin and MadeSolid FireCast resin.

Photoplastic materials may display particularly useful qualities for use in the dental industry. The increased toughness of Photoplastics over traditional (meth)acrylate and vinyl ether based materials suggests they may perform well in some dental applications. Photoplastics may be formulated and processed to improve biocompatibility compared to traditional SLA materials.

Additional resin ingredients. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be non-conductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 um average diameter).

The particles can include an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Light absorbers. In some embodiments, single reaction mechanism energy polymerizable liquids for carrying out the present invention include a pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Inhibitors of polymerization. Inhibitors or polymerization inhibitors for use in the present invention may be in the form of a liquid or a gas. In some embodiments, gas inhibitors are preferred. In some embodiments, liquid inhibitors such as oils or lubricants (e.g., fluorinated oils such as perfluoropolyethers) may be employed, as inhibitors (or as release layers that maintain a liquid interface)). The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. Alternatively, free radical scavengers or inhibitors such as MEHQ (monomethyl ether hydroquinone) and PTZ (phenothiazine) may be used to inhibit polymerization. Additionally, stable radical compounds which can trap free radicals are used to inhibit radical polymerization. In alternative embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable liquids carrying live cells. In some embodiments, the single reaction mechanism energy polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments, the polymerizable liquid can be one that forms a hydrogel, including but not limited to those described in U.S. Pat. Nos. 7,651,683; 7,651,682; 7,556,490; 6,602,975; 5,836,313, the entire contents of which are incorporated herein by reference.

II. Single Reaction Mechanism Energy Polymerizable Liquids: Part B.

Figure 10A:
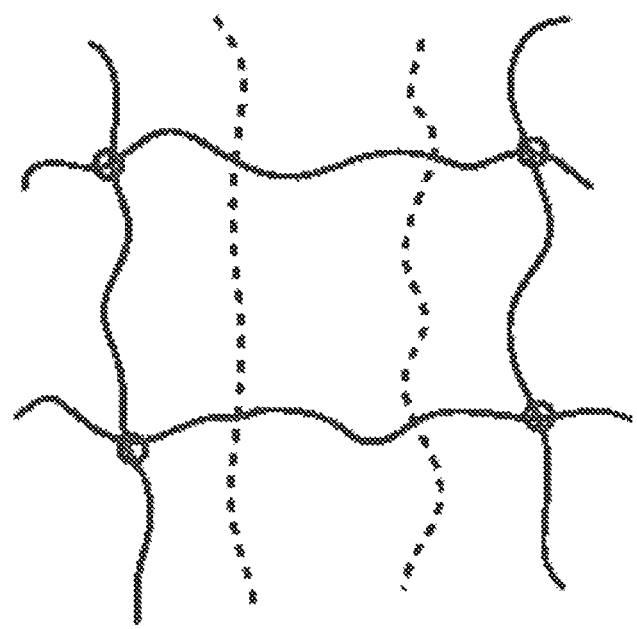
FIG. 10A illustrates a semi-IPN polymerization system employing two components that have different single reaction mechanism, energy polymerizable functional groups I. Multi-functional (meth)acrylate oligomer II. Mono functional vinyl monomer (solid lines=Part I polymer network, dashed lines=Part II polymer network) in accordance with the principles of the present invention.
Figure 10B:
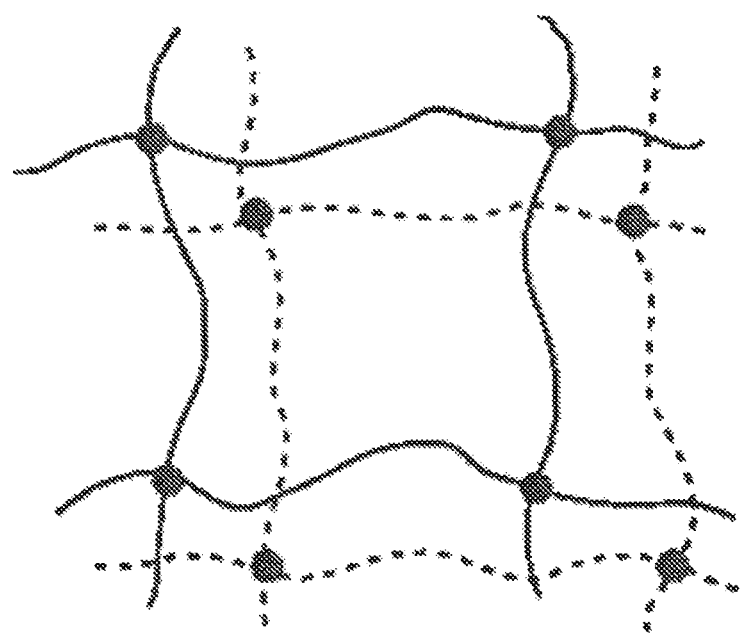
FIG. 10B illustrates a full IPN polymerization system employing two components that have different single reaction mechanism, energy polymerizable functional groups I. Multi-functional (meth)acrylate oligomer II. Multi-functional vinyl monomer (solid lines=Part I polymer network, dashed lines=Part II polymer network) in accordance with the principles of the present invention.
Figure 10C:
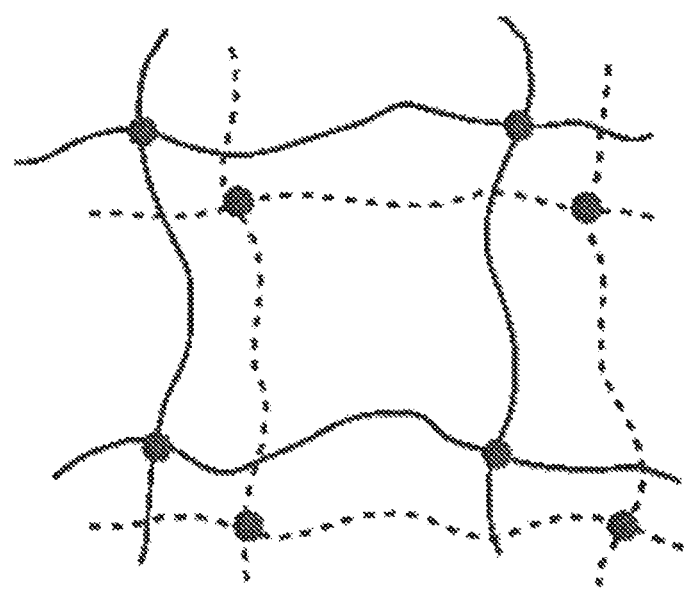
FIG. 10C illustrates a full IPN polymerization system employing two components that have different single reaction mechanism, energy polymerizable functional groups. I. Multi-functional (meth)acrylate oligomer II. Multi-functional vinyl oligomer (solid lines=Part I polymer network, dashed lines=Part II polymer network) in accordance with the principles of the present invention.
Figure 10D:
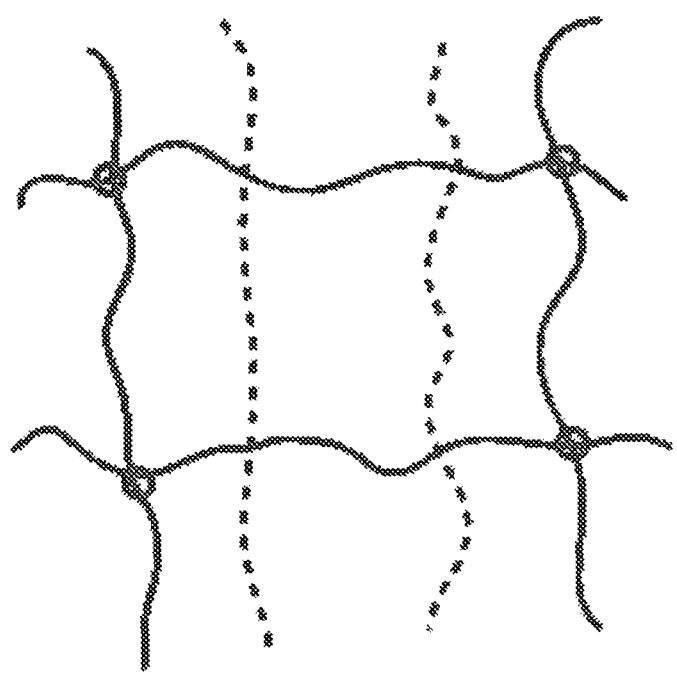
FIG. 10D illustrates a semi-IPN polymerization system employing two components that have different single reaction mechanism, energy polymerizable functional groups. I. Monofunctional (meth)acrylate monomer II. Multi-functional vinyl oligomer (dashed lines=Part I polymer network, solid lines=Part II polymer network) in accordance with the principles of the present invention.
Figure 10E:
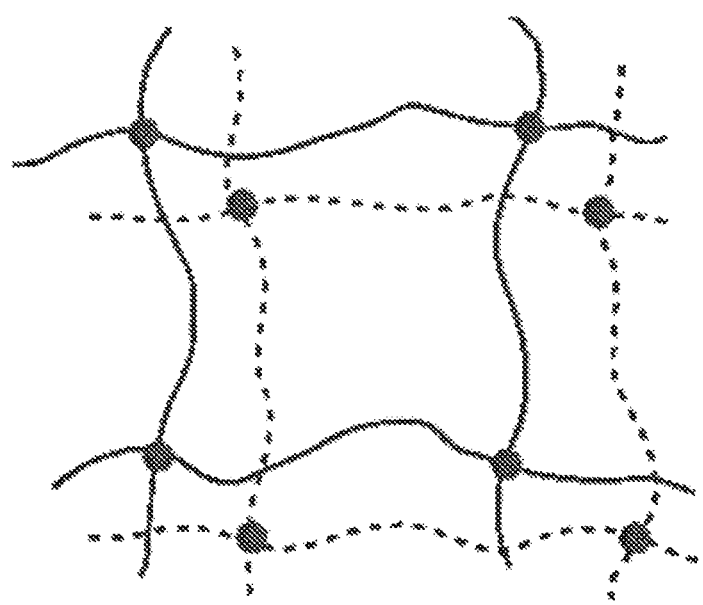
FIG. 10E illustrates a full IPN polymerization system employing two components that have different single reaction mechanism, energy polymerizable functional groups. I. Multi-functional (meth)acrylate monomer II. Multi-functional vinyl oligomer (solid lines=Part I polymer network, dashed lines=Part II polymer network) in accordance with the principles of the present invention.
Figure 10F:
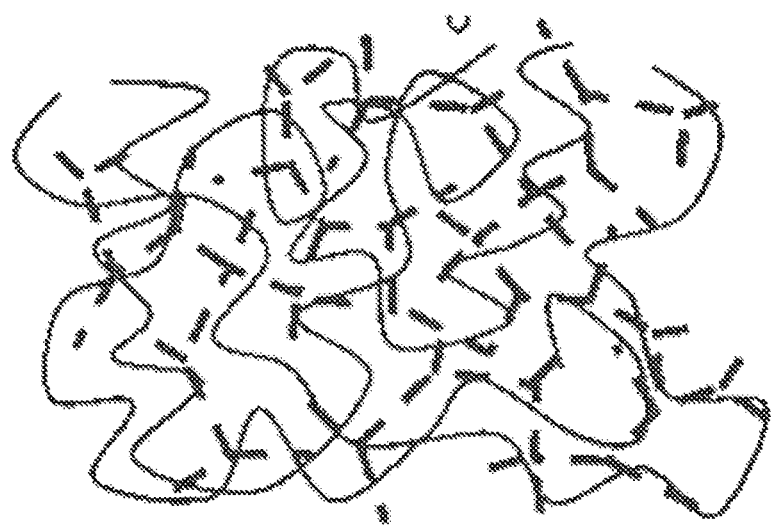
FIG. 10F illustrates a pseudo-IPN polymerization system employing two components that have different single reaction mechanism, energy polymerizable functional groups. I. Mono-functional (meth)acrylate monomer II. Mono-functional vinyl monomer (solid lines=Part I polymer network, broken lines=Part II polymer network) in accordance with the principles of the present invention.

As noted above, in some embodiments of the invention, the single reaction mechanism energy polymerizable liquid includes a first Energy polymerizable component (sometimes referred to as "Part A" herein) and a second component that also solidifies by Energy polymerization, through the same reaction mechanism as the first component (sometimes referred to as "Part B" herein), typically by further reacting, polymerizing, or chain extending. Numerous embodiments thereof may be carried out. In the following, note that, where particular acrylates such as methacrylates are described, other acrylates may also be used. In the following, note that, where particular vinyls such as N-vinyls are described, other vinyls may also be used. FIG. 10 illustrates the different IPN formation that can occur between an acrylate functional and vinyl functional material. These include semi-IPN when a monofunctional monomer is used with a multi-functional monomer or oligomer (FIG. 10A, 10D), a full-IPN when a multi-functional monomer or oligomer is used with a multi-functional monomer of oligomer (FIG. 10B, 10C, 10E), and a pseudo-IPN when a monofunctional monomer is used with a monofunctional monomer (FIG. 10F).

Part A chemistry. As noted above, in some embodiments of the present invention, a resin will have a first component, termed "Part A." Part A includes a mix of monomers and/or oligomers and/or prepolymers that can be polymerized by exposure to actinic radiation or light. This resin can have a functionality of 1 or higher. The purpose of Part A is to "lock" the shape of the material or object being formed or create a scaffold for the one or more additional components (e.g., Part B). Importantly, Part A is present at or above the minimum quantity needed to maintain the shape of the material or object being formed after the initial solidification. In some embodiments, this amount corresponds to less than ten, twenty, or thirty percent by weight of the total resin (polymerizable liquid) composition.

In some embodiments, Part A can react to form a cross-linked polymer network or a solid homopolymer.

Examples of suitable reactive end groups suitable for Part A constituents, oligomers, or prepolymers include, but are not limited to: acrylates, methacrylates, α-olefins, N-vinyls, vinylamides, cyanoacrylates, acrylamides, methacrylamides, acryloyls, styrenics, epoxides, thiols, 1,3-dienes, vinyl halides, acrylonitriles, vinyl esters, maleimides, and vinyl ethers, vinyl carbonates, vinyl carbamates.

An aspect of the solidification of Part A is that it provides a scaffold in which a second reactive resin component, termed "Part B," can solidify during a second step (which may occur concurrently with or following the solidification of Part A). This secondary reaction preferably occurs without significantly distorting the original shape defined during the solidification of Part A. Alternative approaches would lead to a distortion in the original shape in a desired manner.

In particular embodiments, the solidification of Part A is continuously inhibited during printing within a certain region, by oxygen or amines or other reactive species, to form a liquid interface between the solidified part and an inhibitor-permeable film or window (e.g., is carried out by continuous liquid interphase/interface printing).

Part B chemistry. Part B may include a mix of monomers and/or prepolymers that possess reactive end groups that participate in a second solidification reaction during or after the Part A solidification reaction. In some embodiments, Part A and Part B can be premixed, Part B can be added simultaneously to Part A so it is present during the exposure to the Energy radiation, or Part B can be infused into the material or object in a subsequent step after Part A polymerization. Examples of methods employed to solidify Part B include, but are not limited to, contacting the material or object with light at a different wavelength than that at which Part A is polymerized, or light at a same wavelength than that at which Part A is polymerized, or electrons in the case of Electron Beam polymerization, including combinations thereof.

Examples of suitable reactive end groups suitable for Part B constituents, monomers, or prepolymers include, but are not limited to: acrylates, methacrylates, α-olefins, N-vinyls, vinylamides, cyanoacrylates, vinyl carbonates, vinyl carbamates, acrylamides, methacrylamides, styrenics, epoxides, thiols, 1,3-dienes, vinyl halides, acryloyls, acrylonitriles, vinyl esters, maleimides, and vinyl ethers.

Other reactive chemistries suitable for Part B will be recognizable by those skilled in the art. Part B components useful for the formation of polymers described in "Concise Polymeric Materials Encyclopedia" and the "Encyclopedia of Polymer Science and Technology" are hereby incorporated by reference, the entire contents of which are incorporated herein by reference.

Organic peroxides. In some embodiments, an organic peroxide may be included in the single reaction mechanism energy polymerizable liquid or resin, for example to facilitate the reaction of potentially unreacted double bonds during heat and/or microwave irradiation Polymerizing. Such organic peroxides may be included in the resin or polymerizable liquid in any suitable amount, such as from 0.001 or 0.01 or 0.1 percent by weight, up to 1, 2, or 3 percent by weight. Examples of suitable organic peroxides include, but are not limited to, 2,5-bis(tert-butylperoxy)-2,5-dimethylhexane (e.g., LUPEROX 101™), dilauroyl peroxide (e.g. LUPEROX LP™) benzoyl peroxide (e.g., LUPEROX A98™), and bis(tert-butyldioxyisopropyl)benzene (e.g., VulCUP R™), etc., including combinations thereof. Such organic peroxides are available from a variety of sources, including but not limited to Arkema (420 rue d'Estienne d'Orves, 92705 Colombes Cedex, France).

Catalysts. In some embodiments, other catalysts known by those skilled in the art that can affect the speed of polymerization of other Part A or Part B may be employed to control the single reaction mechanism energy polymerization rate of either or both Part A and Part B. (e.g., a metal catalyst such as a peroxide, a tin catalyst, and/or an amine catalyst; platinum or tin catalysts for silicone resins: ruthenium catalysts for ring-opening metathesis polymerization resins; copper catalyst for click chemistry resins; etc., which catalyst is contacted to the article as a liquid aerosol, by immersion, etc.), or an aminoplast containing resin, such as one containing N—(alkoxymethyl)acrylamide, hydroxyl groups, and a blocked acid catalyst.)

Inhibitors. In some embodiments, other inhibitors known by those skilled in the art that can affect the speed or initiation of polymerization of either Part A or Part B may be used to control the initiation or single reaction mechanism energy polymerization rate of either or both Part A and Part B.

In some embodiments, the reaction rate of one component is significantly slower compared to the other component. This can be accomplished by choosing raw materials with significantly different reactivity ratios or by using an inhibitor that preferentially inhibits one component. By slowing the reaction rate, one component can more fully polymerize, prior to the other component fully polymerizing. In some embodiments, this can lead to sequential IPN formation.

In some embodiments, the solubility of the second component in the first component changes during polymerization of the first component. Generally, all components are soluble in the liquid state. In some embodiments, while the first component polymerizes to form a solid, the solubility of the other liquid component changes, which can create solid-liquid phase separation on a nano-, micro- or macro-level. This phase separation may be visible by a refractive index change in the material. This phase separation may change the reactivity preference of the components, assisting in homopolymerization. This phase separation may change the mechanical properties of the material, such as the elasticity or rebound of an elastomer.

In some embodiments, the solubility of the second component in the other component changes during polymerization of the second. Generally, all components are soluble in the liquid state. In some embodiments, while one component polymerizes to form a solid, the solubility of the other liquid component does not significantly change. When the second liquid component polymerizes to a solid it's solubility in the second component changes, which can create solid-solid phase separation on a nano-, micro- or macro-level. This phase separation may be visible by a refractive index change in the material. This phase separation may change the mechanical properties of the material, such as the elasticity or rebound of an elastomer.

In some embodiments of the current invention, it may be useful to use Photoplastics for acoustic or sounds dampening applications. IPN materials have been known to exhibit interesting and unique acoustic, sound, and vibrational properties over a wide temperature range.

In some embodiments of the current invention, Part A consists of a high elongation urethane based (meth)acrylate oligomer. Blended with Part B, which consists primarily of a monofunctional n-Vinyl monomer, Part A of the UV polymerizable component, due to the higher reaction speed or preferential reaction route, is used to solidify an object into the desired shape using 3D printing as described herein and a scaffold for Part B in the single reaction mechanism energy polymerizable liquid. This scaffold is generally very elastomeric but weak. The object can then be additionally polymerized through a single reaction mechanism, energy polymerization, after printing, thereby polymerizing the second component, with forms a strong linear, semi or fully cross-linked IPN through the scaffold, resulting in an object comprising the elastomer.

Adhesion of formed objects. In some embodiments, it may be useful to define the shapes of multiple objects using the solidification of Part A, align those objects in a particular configuration, such that there is a hermetic seal between the objects, then polymerize the secondary solidification of Part B. In this manner, strong adhesion between parts can be achieved during production. A particularly useful example may be in the formation and adhesion of sneaker components.

Fusion of particles as Part B. In some embodiments, "Part B" may simply include small particles of a pre-formed polymer. After the solidification of Part A, the object may be heated above the glass transition temperature of Part B in order to allow the polymerization of the entrapped polymeric particles.

Photo cleavable end groups. In some embodiments, the reactive chemistries in Part A can be Energy Irradiated and cleaved to generate a new reactive species after the solidification of Part A. The newly formed reactive species can further react with Part B in a secondary solidification.

Methods of mixing components. In some embodiments, the components may be mixed in a continuous manner prior to being introduced to the printer build plate. This may be done using multi-barrel syringes and mixing nozzles. For example, Part A may include a UV-polymerizable di(meth)acrylate resin, Part B may comprise or consist of vinyl monomer. Both Part A and Part B can generally be premixed well before application, as all components are very shelf stable, even when combined. Shelf stable can be defined as having a viscosity within 10% of original viscosity, of a premixed bottle for 1, 2, 3 or 4 years at ambient conditions. This can be simulated by high temperature stability of 1, 2, 3, 4 weeks at 60 C. However, if necessary, a second syringe barrel would contain the material of Part B. Additionally, when the resin is introduced to the printer in this fashion, a constant time is defined between mixing of all components and solidification of Part A or Part B.

Other additive manufacturing techniques. It will be clear to those skilled in the art that the materials described in the current invention will be useful in other additive manufacturing techniques including fused deposition modeling (FDM), solid laser sintering (SLS), and Ink-jet methods. In some embodiments, Part A includes an acrylate, a methacrylate, a styrene, an acrylic acid, an N-vinyl, an acryloyl, a vinylamide, a vinyl ether, a vinyl carbonate, a vinyl carbamate, a vinyl ester (including derivatives thereof), polymers containing any one or more of the foregoing, and combinations of two or more of the foregoing (for example, acrylonitrile, styrene, divinyl benzene, vinyl toluene, methyl acrylate, ethyl acrylate, butyl acrylate, methyl(meth)acrylate, amine(meth)acrylates as described above, and mixtures of any two or more of these). (See, for example, US Patent Application Publication No. 20140072806, the entire contents of which are incorporated herein by reference.)

In some embodiments, Part B includes an acrylate, a methacrylate, a styrene, an acrylic acid, an N-vinyl, a vinylamide, an acryloyl, a vinyl ether, a vinyl carbonate, a vinyl carbamate, a vinyl ester (including derivatives thereof), polymers containing any one or more of the foregoing, and combinations of two or more of the foregoing. For example, acrylonitrile, styrene, divinyl benzene, vinyl toluene, methyl acrylate, ethyl acrylate, butyl acrylate, methyl(meth)acrylate, amine(meth)acrylates as described above, and mixtures of any two or more of these. (See, for example, US Patent Application Publication No. 20140072806. the entire contents of which are incorporated herein by reference.)

Elastomers. A particularly useful embodiment for implementing the invention is for the formation of elastomers. Tough, high-elongation, high strength elastomers are difficult to achieve using traditional liquid UV-polymerizable precursors. However, through the creation of an IPN network, elastomers can be formed under single reaction mechanism energy polymerization that are comparable and can exceed the properties of known polyurethanes, silicones, natural rubbers, etc. These single reaction mechanism energy polymerized elastomers can have elongation>750% and/or tensile strength>20 MPa.

In some embodiments, the single reaction mechanism energy polymerizable liquid includes: a) from 5 or 20 or 40 percent by weight to 60 or 80 or 90 percent by weight of Part A; b) from 10 or 20 percent by weight to 30 or 40 or 50 or 60 or 70 percent by weight of Part B; c) from 0.1 or 0.2 percent by weight to 1, 2 or 4 or 8 percent by weight of the photoinitiator; d) Optional additional ingredients, such as dyes, fillers (e.g., silica), surfactants, etc., may also be included, as discussed in greater detail above. An advantage of some embodiments of the invention is that, because these single reaction mechanism energy polymerizable liquids do not polymerize upon mixing, they may be formulated in advance, and the filling step carried out by feeding or supplying the polymerizable liquid to the build region from a single source (e.g., a single reservoir containing the polymerizable liquid in pre-mixed form), thus obviating the need to modify the apparatus to provide separate reservoirs and mixing capability.

Three dimensional objects made by the process are, in some embodiments, collapsible or compressible (that is, elastic (e.g., has a Young's modulus at room temperature of from about 0.001, 0.01 or 0.1 gigapascals to about 1, 2 or 4 gigapascals, and/or a tensile strength at maximum load at room temperature of about 0.01, 0.1, or 1 to about 50, 100, or 500 megapascals, and/or a percent elongation at break at room temperature of about 10, 20 50 or 100 percent to 1000, 2000, or 5000 percent, or more).

In some embodiments, through a single reaction mechanism, after energy polymerizing to form an intermediate shaped product having polyurethane oligomers as a scaffold, the entire material is subjected to another energy polymerization, during which an IPN of the second component is polymerized. The Energy polymerization time needed can vary depending on the Energy source, temperature, size, shape, and density of the product, but is typically between 1 second to multiple hours depending on the specific single reaction mechanism energy induced system used and size of the product.

In general, a film or three-dimensional product produced through a single reaction mechanism, of the foregoing methods includes (i) a linear or semi-crosslinked or fully crosslinked Energy polymerized network, (ii) a full or semi cross-linked Energy polymerized polymer built from monomers or oligomers containing Energy polymerizable functional groups (iii) combinations thereof, for example as an IPN, a semi-IPN, simultaneous IPN, a sequential IPN, as a Dual Network or some combination thereof. In some example embodiments, the film or three-dimensional product may also include unreacted photoinitiator remaining in the film or three-dimensional formed object. For example, in some embodiments, from 0.1 or 0.2 percent by weight to 1, 2 or 4 percent by weight of the photoinitiator may remain in the film or three-dimensional formed object or the photoinitiator may be present in lower amounts or only a trace amount. In some example embodiments, the film or three-dimensional product may also include reacted photoinitiator fragments. For example, in some embodiments, the reacted photoinitiator fragments may be remnants of the first polymerization forming the intermediate product. For example, from 0.1 or 0.2 percent by weight to 1, 2 or 4 percent by weight of reacted photoinitiator fragments may remain in the film or three-dimensional formed object or the reacted photoinitiator fragments may be present in lower amounts or only a trace amount. In example embodiments, a film or three-dimensional product, produced through a single reaction mechanism, may include all or any combination of a crosslinked or linear Energy polymerized network, a different cross-linked Energy polymerized network, unreacted photoinitiator and reacted photoinitiator materials.

These materials may be used in bottom-up additive manufacturing techniques such as the continuous liquid interface printing techniques described herein, or other additive manufacturing techniques as noted above and below.

These materials may be used in inkjet printing manufacturing techniques such as the piezoelectric printing techniques described herein, or other inkjet printing techniques as noted above and below.

Articles Comprised of Interpenetrating Polymer Networks (IPNs) Formed from single reaction mechanism energy polymerizable Liquids.

In some embodiments, single reaction mechanism energy polymerizable liquids comprising single reaction systems such as described above are useful in forming film or three-dimensional articles that in turn comprise IPNs.

In non-limiting examples, the single reaction mechanism energy polymerizable liquid and method steps are selected so that the film or three-dimensional object comprises the following:

Sol-gel compositions. This may be carried out with an amine (ammonia) permeable window or semipermeable member. In the system discussed here, tetraethyl orthosilciate (TEOS), epoxy (diglycidyl ether of Bisphenol A), and 4-amino propyl triethoxysilane are be added to a free radical crosslinker and in the process the free radical crosslinker polymerizes and contain the noted reactants which are then reacted in another step or stage. Reaction requires the presence of water and acid. Photoacid generators (PAGs) could optionally be added to the mixture described above to promote the reaction of the silica based network. Note that if only TEOS is included one will end up with a silica (glass) network. One can then increase the temperature to remove the organic phase and be left with a silica structure that would be difficult to prepare by more conventional methods. Many variations (different polymeric structures) can be prepared by this process in addition to epoxies including urethanes, functionalized polyols, silicone rubber etc.)

Hydrophobic-hydrophilic IPNs. Examples include hydrophobic-hydrophilic networks for improved blood compatibility as well as tissue compatibility for biomedical parts. Poly(N-vinylpyrrolidone) is an example of a hydrophilic component. Polybutadiene is an example of a hydrophobic component.

Conductive polymers. The incorporation of aniline and ammonium persulfate into the single reaction mechanism energy polymerizable liquid is employed to produce a conductive part. After the reactive system is polymerized and a post treatment with acid (such as HCl vapor), polymerization to polyaniline can then commence.

Natural product based IPNs. Numerous of natural product based IPNs are known based on triglyceride oils such as castor oil, or gelatin or Polyvinyl alcohol. These can be incorporated into the single reaction mechanism energy polymerizable liquid. Upon completion of the part, these may form an additional IPN. Glycerol can of course also be used.

Sequential IPNs. In some of the embodiments, the scaffold crosslinked network is swollen with a monomer and free radical photoinitiator and optionally crosslinker followed by polymerization.

Simultaneous IPNs. In some of the embodiments, both networks are formed during the first polymerization process.

III. Fabrication Products

A. Example Three-Dimensional (3D) Objects.

Three-dimensional products produced by the methods and processes of the present invention may be final, finished or substantially finished products, or may be intermediate products subject to further manufacturing steps such as surface treatment, laser cutting, electric discharge machining, etc., is intended. Intermediate products include products for which further additive manufacturing, in the same or a different apparatus, may be carried out). For example, a fault or cleavage line may be introduced deliberately into an ongoing "build" by disrupting, and then reinstating, the gradient of polymerization zone, to terminate one region of the finished product, or simply because a particular region of the finished product or "build" is less fragile than others.

Numerous different products can be made by the methods and apparatus of the present invention, including both large-scale models or prototypes, small custom products, miniature or microminiature products or devices, etc. Examples include, but are not limited to, medical devices and implantable medical devices such as hearing aids, stents, drug delivery depots, functional structures, microneedle arrays, fibers and rods such as waveguides, micromechanical devices, microfluidic devices, etc.

Thus, in some embodiments the product can have a height of from 0.1 or 1 millimeters up to 10 or 100 millimeters, or more, and/or a maximum width of from 0.1 or 1 millimeters up to 10 or 100 millimeters, or more. In other embodiments, the product can have a height of from 10 or 100 nanometers up to 10 or 100 microns, or more, and/or a maximum width of from 10 or 100 nanometers up to 10 or 100 microns, or more. These are examples only: Maximum size and width depends on the architecture of the particular device and the resolution of the light source and can be adjusted depending upon the particular goal of the embodiment or article being fabricated.

In some embodiments, the ratio of height to width of the product is at least 2:1, 10:1, 50:1, or 100:1, or more, or a width to height ratio of 1:1, 10:1, 50:1, or 100:1, or more.

In some embodiments, the product has at least one, or a plurality of, pores or channels formed therein, as discussed further below.

The processes described herein can produce products with a variety of different properties. Hence in some embodiments the products are rigid; in other embodiments, the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single, single reaction mechanism energy polymerizable liquid); in some embodiments, the products are composites (that is, formed of two or more different single reaction mechanism energy polymerizable liquids). Particular properties will be determined by factors such as the choice of single reaction mechanism energy polymerizable liquid(s) employed.

In some embodiments, the product or article made has at least one overhanging feature (or "overhang"), such as a bridging element between two supporting bodies, or a cantilevered element projecting from one substantially vertical support body. Because of the unidirectional, continuous nature of some embodiments of the present processes, the problem of fault or cleavage lines that form between layers when each layer is polymerized to substantial completion and a substantial time interval occurs before the next patter is exposed, is substantially reduced. Hence, in some embodiments the methods are particularly advantageous in reducing, or eliminating, the number of support structures for such overhangs that are fabricated concurrently with the article.

B. Example Structures and Geometries of 3D Objects.

In example embodiments, the three-dimensional (3D) object may be formed with thousands or millions of shape variations imparted on the three-dimensional object while being formed. In example embodiments, the pattern generator generates different patterned irradiation of light to activate photoinitiator in the region of the gradient of polymerization to impart different shapes as the object is extracted through the gradient of polymerization. In example embodiments, the pattern generator may have high resolution with millions of pixel elements that can be varied to change the shape that is imparted. For example, the patter generator may be a DLP with more than 1,000 or 2,000 or 3,000 or more rows and/or more than 1,000 or 2,000 or 3,000 or more columns of micromirrors, or pixels in an LCD panel, that can be used to vary the shape. As a result, very fine variations or gradations may be imparted on the object along its length. In example embodiments, this allows complex three-dimensional objects to be formed at high speed with a substantially continuous surface without cleavage lines or seams. In some examples, more than a hundred, thousand, ten thousand, hundred thousand or million shape variations may be imparted on the three-dimensional object being formed without cleavage lines or seams across a length of the object being formed of more than 1 mm, 1 cm, 10 cm or more or across the entire length of the formed object; In example embodiments, the object may be continuously formed through the gradient of polymerization at a rate of more than 1, 10, 100, 1000, 10000 or more microns per second.

In example embodiments, this allows complex three-dimensional (3D) objects to be formed. In some example embodiments, the 3D formed objects have complex non-injection moldable shapes. The shapes may not be capable of being readily formed using injection molding or casting. For example, the shapes may not be capable of being formed by discrete mold elements that are mated to form a cavity in which fill material is injected and polymerized, such as a conventional two-part mold. For example, in some embodiments, the 3D formed objects may include enclosed cavities or partially open cavities, repeating unit cells, or open-cell or closed-cell foam structures that are not amenable to injection molding and may include hundreds, thousands or millions of these structures or interconnected networks of these structures. However, in example embodiments, these shapes may be 3D formed using the methods described in the present application with a wide range of properties, including a wide range of elastomeric properties, tensile strength and elongation at break through the use of dual polymerization materials and/or IPNs to form these structures. In example embodiments, the 3D objects may be formed without cleavage lines, parting lines, seams, sprue, gate marks or ejector pin marks that may be present with injection molding or other conventional techniques. In some embodiments, the 3D formed objects may have continuous surface texture (whether smooth, patterned or rough) that is free from molding or other printing artifacts (such as cleavage lines, parting lines, seams, sprue, gate marks or ejector pin marks) across more than 1 mm, 1 cm, 10 cm or more or across the entire length of the formed object. In example embodiments, complex 3D objects may be formed with no discrete layers visible or readily detectable from the printing process in the finished 3D object across more than 1 mm, 1 cm, 10 cm or more or across the entire length of the formed object. For example, the varying shapes imparted during the course of printing by the pattern generator may not be visible or detectable as different layers in the finished 3D object since the printing occurs through the gradient of polymerization zone (from which the 3D object is extracted as it is exposed by varying patterns projected from the pattern generator). While the 3D objects resulting from this process may be referred to as 3D printed objects, the 3D objects may be formed through continuous liquid interphase printing without the discrete layers or cleavage lines associated with some 3D printing processes.

In some embodiments, the 3D formed object may include one or more repeating structural elements to form the 3D objects, including, for example, structures that are (or substantially correspond to) enclosed cavities, partially-enclosed cavities, repeating unit cells or networks of unit cells, foam cell, Kelvin foam cell or other open-cell or closed-cell foam structures, crisscross structures, overhang structures, cantilevers, microneedles, fibers, paddles, protrusions, pins, dimples, rings, tunnels, tubes, shells, panels, beams (including I-beams, U-beams, W-beams and cylindrical beams), struts, ties, channels (whether open, closed or partially enclosed), waveguides, triangular structures, tetrahedron or other pyramid shape, cube, octahedron, octagon prism, icosidodecahedron, rhombic triacontahedron or other polyhedral shapes or modules (including Kelvin minimal surface tetrakaidecahedra, prisms or other polyhedral shapes), pentagon, hexagonal, octagon and other polygon structures or prisms, polygon mesh or other three-dimensional structure. In some embodiments, a 3D formed object may include combinations of any of these structures or interconnected networks of these structures. In an example embodiments, all or a portion of the structure of the 3D formed object may correspond (or substantially correspond) to one or more Bravais lattice or unit cell structures, including cubic (including simple, body-centered or face-centered), tetragonal (including simple or body-centered), monoclinic (including simple or end-centered), orthohombic (including simple, body-centered, face-centered or end-centered), rhombohedral, hexagonal and tridinic structures. In example embodiments, the 3D formed object may include shapes or surfaces that correspond (or substantially correspond) to a catenoid, helicoid, gyroid or lidinoid, other triply periodic minimal surface (TPMS), or other geometry from the associate family (or Bonnet family) or Schwarz P ("Primitive") or Schwarz D ("Diamond"), Schwarz H ("Hexagonal") or Schwarz CLP ("Crossed layers of parallels") surfaces, argyle or diamond patterns, lattice or other pattern or structure.

In example embodiments, the pattern generator may be programmed to vary rapidly during printing to impart different shapes into the gradient of polymerization with high resolution. As a result, any of the above structural elements may be formed with a wide range of dimensions and properties and may be repeated or combined with other structural elements to form the 3D object. In example embodiments, the 3D formed object may include a single three-dimensional structure or may include more than 1, 10, 100, 1000, 10000, 100000, 1000000 or more of these structural elements. The structural elements may be repeated structural elements of similar shapes or combinations of different structural elements and can be any of those described above or other regular or irregular shapes. In example embodiments, each of these structural elements may have a dimension across the structure of at least 10 nanometers, 100 nanometers, 10 microns, 100 microns, 1 mm, 1cm, 10 cm, 50 cm or more or may have a dimension across the structure of less than 50 cm, 10 cm, 1 cm, 1 mm, 100 microns, 10 microns, 100 nanometers or 10 nanometers or less. In example embodiments, a height, width or other dimension across the structure may be in the range of from about 10 nanometers to about 50 cm or more or any range subsumed therein. As used herein, "any range subsumed therein" means any range that is within the stated range. For example, the following are all subsumed within the range of about 10 nanometers to about 50 square cm and are included herein: 10 nanometers to 1 micron; 1 micron to 1 millimeter, 1 millimeter to 1 centimeter, and 1 centimeter to 50 cm or any other range or set of ranges within the stated range. In example embodiments, each of the structural elements may form a volume of the 3D object in the range of from about 10 square nanometers to about 50 square cm or more or any range subsumed therein. In example embodiments, each of the structural elements may form a cavity or hollow region or gap between surfaces of the structural element having a dimension across the cavity or hollow region or gap in the range of from about 10 nanometers to about 50 cm or more or any range subsumed therein or may define a volume within the expanse of the 3D formed object in the range of from about 10 square nanometers to about 50 square cm or more or any range subsumed therein.

The structural elements may be about the same size or the size may vary throughout the volume of the 3D formed object. The sizes may increase or decrease from one side of the 3D formed object to another side (gradually or stepwise) or elements of different shapes may be intermixed in regular or irregular patterns (for example, a 3D elastomeric foam with varying sizes of open-cell and/or closed-cell cavities intermixed throughout the foam).

In some embodiments, the 3D formed objects may have irregular shapes with overhangs, bridging elements or asymmetries or may otherwise have an offset center of gravity in the direction being formed. For example, the 3D formed object may be asymmetric. In example embodiments, the 3D formed object may not have rotational symmetry around any axis or may have rotational symmetry only around a single axis. In example embodiments, the 3D formed object may not have reflectional symmetry around any plane through the 3D formed object or may have reflectional symmetry only around a single plane. In example embodiments, the 3D object may have an offset center of gravity. For example, the center of gravity of the 3D formed object may not be at the positional center of the object. In some examples, the center of gravity may not be located along any central axis of the object. For example, the 3D formed object may be a shoe sole or insert that generally follows the contour of a foot. The shoe sole or insert may tilt to the right or left and have different widths for the heel and toes. As a result, the 3D formed object in this example will not have reflectional symmetry from side to side or front to back. However, it may have reflectional symmetry from bottom to top if it is a uniformly flat shoe sole or insert. In other examples, the shoe sole or insert may be flat on one side and be contoured to receive the arch of a foot on the other side and, as a result, will not have reflectional symmetry from bottom to top either. Other 3D formed objects for wearable, prosthetic or anatomical shapes or devices may have similar asymmetries and/or offset center of gravity. For example, a 3D formed object for a dental mold or dental implant may substantially conform to the shape of a tooth and may not have reflectional symmetry about any plane. In another example, a 3D formed component for a soft robotics, such as the grips, handles or internally pressurized materials which may come into contact with objects for picking up, lifting or moving. The elastomeric materials described in the examples can be particularly useful for soft robotics applications. In another example, a 3D formed component for a wearable device may substantially conform to the shape of a body party and have corresponding asymmetries, such as athletic wear such as a right or left contoured shin guard or foam padding or insert for use between a hard shin guard or a helmet or other wearable component and the human body. These are examples only and any number of 3D formed objects may be asymmetric and/or have an offset center of gravity. In example embodiments, where there are significant asymmetries or protruding elements (such as arms, bridging elements, cantilevers, brush fibers or the like) and the desired structural elements will be elastomeric, there is a potential for deformation during 3D printing or subsequent Polymerizing. For example, if a large amount of non-UV polymerizable elastomeric resin material is included, gravity may cause deformation before final Polymerizing. While the scaffold formed from UV-polymerizable material during 3D printing (from the initial polymerization in a dual polymerization process) helps lock-in the shape, some elastomeric compositions with highly asymmetric or protruding shapes may be susceptible to deformation. In some example embodiments, the UV polymerizable material in the composition may be adjusted to form a more rigid scaffold to avoid deformation. In other example embodiments, objects with asymmetric shapes and/or offset center of gravity may be formed in pairs (or in other combinations) with connectors that are later removed, particularly if the 3D formed objects or protruding elements are relatively long. In an example, an elastomeric 3D object may be formed along a length, and have an asymmetry, center of gravity offset and/or protruding element transverse to the length that is more than 10%, 20%, 30%, 40%, 50% or more of the length. For example, the 3D formed object may have a length of about 1 cm to 50 cm or more or any range subsumed therein and may have a transverse or lateral asymmetry or protruding element of about 1 cm to 50 cm or more or any range subsumed therein. In an example embodiment, two or more of these objects may be formed together in a way that provides support for the transverse or protruding elements until the elastomeric material is polymerized and the objects are separated. For example, two shoe soles may be formed (e.g., when formed in the direction of their length) as a pair (for example, with rotated and inverted shoe soles formed together with small removable connectors between them) such that the soles provide support to one another while being formed. In other example embodiments, other support structures may be formed and removed after Polymerizing of the elastomeric material.

C. Example Materials and Compositions of 3D Objects.

In example embodiments, 3D formed objects, produced through a single reaction mechanism, may have any of the above shapes or structures and may comprise or consist of or consist essentially (i) a linear, semi or full crosslinked Energy polymerized network, (ii) a full or semi cross-linked Energy polymerized polymer built from monomers or oligomers containing Energy polymerizable functional groups or (iii) combinations thereof, for example as an IPN, a semi-IPN, simultaneous IPN, or as a sequential IPN, or some combination thereof and/or (iv) photoinitiator, including unreacted photoinitiator and/or reacted photoinitiator fragments.

In some example embodiments, the 3D formed object may include sol-gel compositions, hydrophobic or hydrophilic compositions, phenolic resoles, cyanate esters, polyimides, conductive polymers, natural product based IPNs, sequential IPNs, simultaneous IPNs and polyolefin as described above.

In example embodiments, 3D formed objects may have any of the shapes or structures described above and may comprise or consist of or consist essentially of a plurality of different materials in different regions of the 3D formed object with different tensile strength or other varying properties. In example embodiments, the differing materials may be selected from any of those describe above. In some example embodiments, the process of fabricating the product may be paused or interrupted one or more times, to change the single reaction mechanism energy polymerizable liquid. In example embodiments, 3D formed objects may include multiple materials (which may, for example, be a thermoplastic or thermoset polyurethane, polyurea, or copolymer thereof or silicone rubber or epoxy or combination of the foregoing) with different tensile strengths as described further below. While a fault line or plane may be formed in the intermediate by the interruption, if the subsequent single reaction mechanism energy polymerizable liquid is, in its second polymerizable material, reactive with that of the first, then the two distinct segments of the intermediate will cross-react and covalently couple to one another during the second polymerization (e.g., by heating or microwave irradiation). Thus, for example, any of the materials described herein may be sequentially changed to form a product having multiple distinct segments with different tensile properties, while still being a unitary product with the different segments covalently coupled to one another.

In example embodiments, the described Photoplastic materials or any combination of the foregoing may comprise a majority of the 3D formed object by weight and may comprise more than 50%, 60%, 70%, 80% or 90% of the 3D formed object by weight.

In example embodiments, 3D formed objects, produced through a single reaction mechanism, may have any of the above shapes or structures and may comprise or consist of or consist essentially (i) a linear or semi-crosslinked or fully crosslinked Energy polymerized network, (ii) a full or semi cross-linked Energy polymerized polymer built from monomers or oligomers containing Energy polymerizable functional groups or (iii) combinations thereof, for example as an IPN, a semi-IPN, simultaneous IPN, or as a sequential IPN, or some combination thereof may comprise a majority of the 3D formed object by weight and may comprise more than 50%, 60%, 70%, 80% or 90% of the 3D formed object by weight.

In some example embodiments, the 3D formed object may include sol-gel compositions, hydrophobic or hydrophilic compositions, phenolic resoles, cyanate esters, polyimides, conductive polymers, natural product based IPNs, sequential IPNs and polyolefin as described above.

D. Example of Film Materials

Any Material that is Applied to a Substrate, by Flexography, Lithography, Gravure, Offset, Spray Coating, Roll Coating, Curtin Coating, Inkjet Deposition, Stamping, Brush These films may be a variety of sizes. The American Society for Testing and Materials (ASTM) has defined "film" as a plastic sheeting 0.25 mm or less in thickness. Sheet materials thicker than 0.25 mm are considered sheet. Sheet extrusion produces stock for use in most thermoforming operations. However, films greater than 0.25 mm may be considered, so long as they are permanently affixed to a substrate.

Example photoinitiator and photoinitiator fragments. In example embodiments, the film or 3D formed object may include unreacted photoinitiator remaining in the film or 3D formed object. For example, in some embodiments, from 0.1 or 0.2 percent by weight to 1, 2 or 4 percent by weight of the photoinitiator may remain in the film or three-dimensional formed object or the photoinitiator may be present in lower amounts or only a trace amount. In some example embodiments, the film or three-dimensional product may also include reacted photoinitiator fragments. For example, in some embodiments, the reacted photoinitiator fragments may be remnants of the first polymerization forming the intermediate product. For example, from 0.1 or 0.2 percent by weight to 1, 2 or 4 percent by weight of reacted photoinitiator fragments may remain in the film or three-dimensional formed object or the reacted photoinitiator fragments may be present in lower amounts or only a trace amount.

In example embodiments, because the systems, in part, consist of monomers and oligomers capable of being polymerized by exposure to UV light, the end products may contain residual photoinitiator molecules and photoinitiator fragments.

In some embodiments, a photopolymerization will undergo the transformation outlined below. In the first step, initiation, UV light cleaves the initiator into active radical fragments. These active radical fragments will go on to react with monomer group "M." During the propagation step, the active monomer will react with additional monomers that attach to the growing polymer chain. Finally, termination can occur either by recombination or by disproportionation.

Initiation

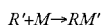

Propagation

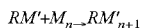

Termination
Combination

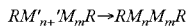

Disproportionation

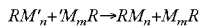

In example embodiments, 3D formed objects generated by the processes outlined herein may contain the following chemical products after the object is created:

Latent unreacted photoinitiator-photoinitiator is rarely 100% consumed during photopolymerization, therefore the product will typically contain unreacted photoinitiators embedded throughout the solid object:

Photoinitiator by-products covalently attached to the polymer network. In example embodiments, photoinitiators may include the following:

Benzoyl-Chromophore Based: These systems take the form:

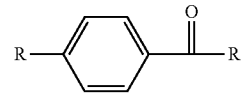

where "R" is any number of other atoms, including H, O, C, N, S. These initiators cleave to form:

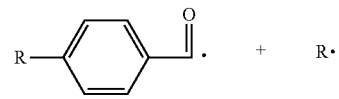

Where "·" represents a free radical. Either of these components may go on to initiate polymerization and will therefore be covalently bound to the polymer network

An example of such an initiator is shown below

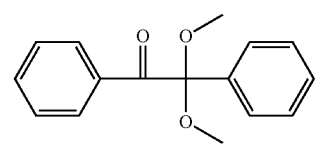 [SMILES: COC(OC)(C(=O)c1ccccc1)c1ccccc1]

Morpholino and Amino Ketones. These systems take the form:

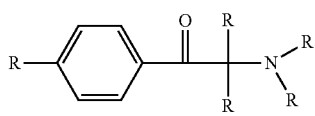

where "R" is any number of other atoms including H, O, C, N, S. These initiators cleave to form

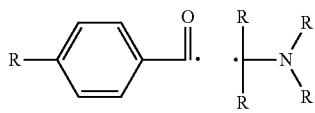

Where "·" represents a free radical. Either of these components may go on to initiate polymerization and will therefore be covalently bound to the polymer network.

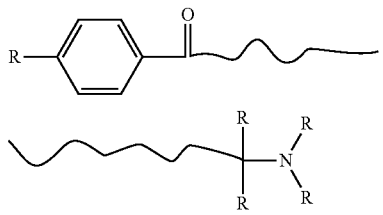

An example of such an initiator is shown below

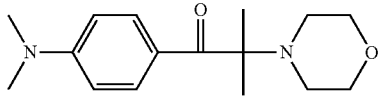 [SMILES: CN(C)c1ccc(C(=O)C(C)(C)N2CCOCC2)cc1]

Benzoyl Phosphine Oxide. These systems take the form

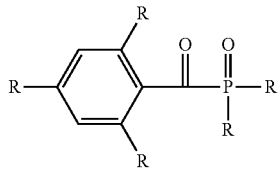

where "R" is any number of other atoms including H, O, C, N, S. These initiators cleave to form

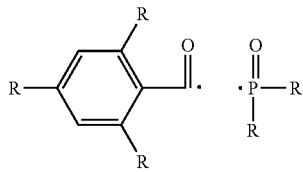

Where "·" represents a free radical. Either of these components may go on to initiate polymerization and will therefore be covalently bound to the polymer network.

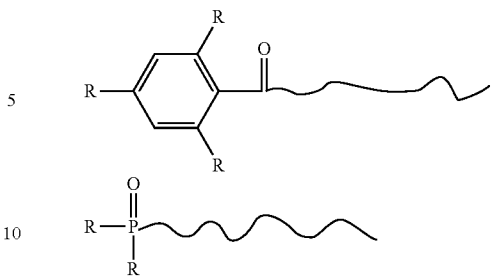

An example of such an initiator is shown below

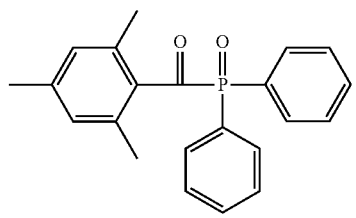 [SMILES: Cc1cc(C)c(C(=O)P(=O)(c2ccccc2)c2ccccc2)c(C)c1]

Amines. Many photoinitiators may be utilized in combination with amines. Here the photoinitiators in the excited state serve to abstract a hydrogen atom from the amine, thus generating an active radical. This radical can go on to initiator polymerization and will therefore become incorporated into the formed polymer network. This process is outlined below:

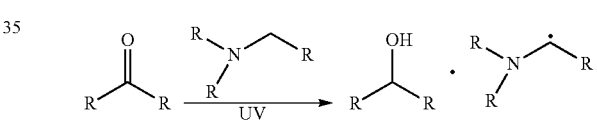

Either of these active species can go on to form an active polymer chain resulting in the structures below:

Other systems. Other types of photoinitiators that may be used to generate such materials and therefore will generate fragments which are covalently attached to the formed polymer network include: triazines, ketones, peroxides, diketones, azides, azo derivatives, disulfide derivatives, disilane derivatives, thiol derivatives, diselenide derivatives, diphenylditelluride derivatives, digermane derivatives, distannane derivatives, carob-germanium compounds, carbon-silicon derivatives, sulfur-carbon derivatives, sulfur-silicon derivatives, peresters, Barton's ester derivatives, hydroxamic and thiohydroxamic acids and esters, organoborates, organometallic compounds, titanocenes, chromium complexes, alumate complexes, carbon-sulfur or sulfur-sulfur iniferter compounds, oxyamines, aldehydes, acetals, silanes, phosphorous-containing compounds, borane complexes, thioxanthone derivatives, coumarins, anthraquinones, fluorenones, ferrocenium salts. These photoinitiators may also be oligomeric or polymeric, where they are attached to larger molecules, to reduce the migration, hazards, etc. of the initiating species.

Detection. Detection of the unique chemical fingerprint of photoinitiator fragments in a polymerized polymer object can be accomplished by a number of spectroscopic techniques. Particular techniques useful alone or in combination include: UV-Vis spectroscopy, fluorescence spectroscopy, infrared spectroscopy, nuclear magnetic resonance spectroscopy, mass spectrometry, atomic absorption spectroscopy, Raman spectroscopy, and X-Ray photoelectron spectroscopy.

E. Example Properties of 3D Objects.

The structural properties of the 3D formed object may be selected together with the properties of the materials from which the 3D object is formed to provide a wide range of properties for the 3D object. Materials and methods described above in the present application may be used to form complex shapes with desired materials properties to form a wide range of 3D objects.

In some embodiments, 3D formed objects may be rigid and have, for example, a Young's modulus (MPa) in the range of about 800 to 4500 or any range subsumed therein, a Tensile Strength (MPa) in the range of about 30 to 150 or any range subsumed therein, a percent elongation at break in the range of about 1 to 100 or any range subsumed therein and/or a notched IZOD impact strength of about 10 to 200 J/m or any range subsumed therein. Non-limiting examples of such rigid 3D formed objects may include fasteners; electronic device housings; gears, propellers, and impellers; wheels, mechanical device housings; tools and other rigid 3D objects.

In some embodiments, 3D formed objects may be semi-rigid and have, for example, a Young's modulus (MPa) in the range of about 300-3500 or any range subsumed therein, a Tensile Strength (MPa) in the range of about 20-90 or any range subsumed therein, a percent elongation at break in the range of about 20 to 300 or 600 or any range subsumed therein, and/or a notched IZOD impact strength of about 30 to 400 J/m or any range subsumed therein. Non-limiting examples of such semi-rigid 3D formed objects may include structural elements; hinges including living hinges; boat and watercraft hulls and decks; wheels; bottles, jars and other containers; pipes, liquid tubes and connectors and other semi-rigid 3D objects.

In some embodiments, 3D formed objects may be elastomeric and have, for example, a Young's modulus (MPa) in the range of about 0.25-300 or any range subsumed therein, a Tensile Strength (MPa) in the range of about 0.5-30 or any range subsumed therein, a percent elongation at break in the range of about 50-1500 or any range subsumed therein, and/or a tear strength of about 10 to 200 kN/m or any range subsumed therein. Non-limiting examples of such elastomeric 3D formed objects may include foot-wear soles, heels, innersoles and midsoles; bushings and gaskets; components of soft robotics; cushions; electronic device housings and other elastomeric 3D objects.

Figure 1B:
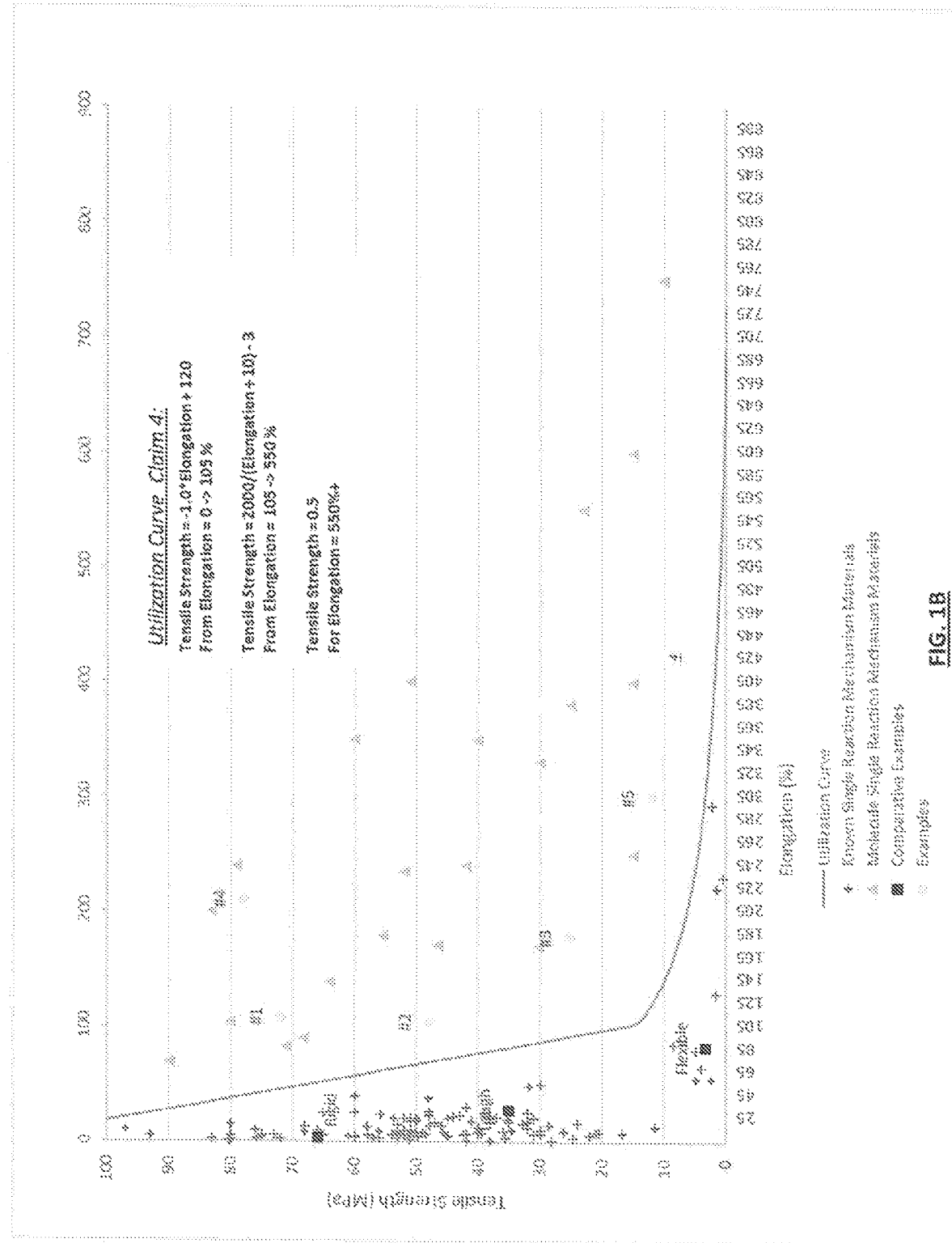
FIG. 1B is another plot of a single reaction mechanism, energy polymerizable polymers in accordance with the principles of the present invention.
Figure 1C:
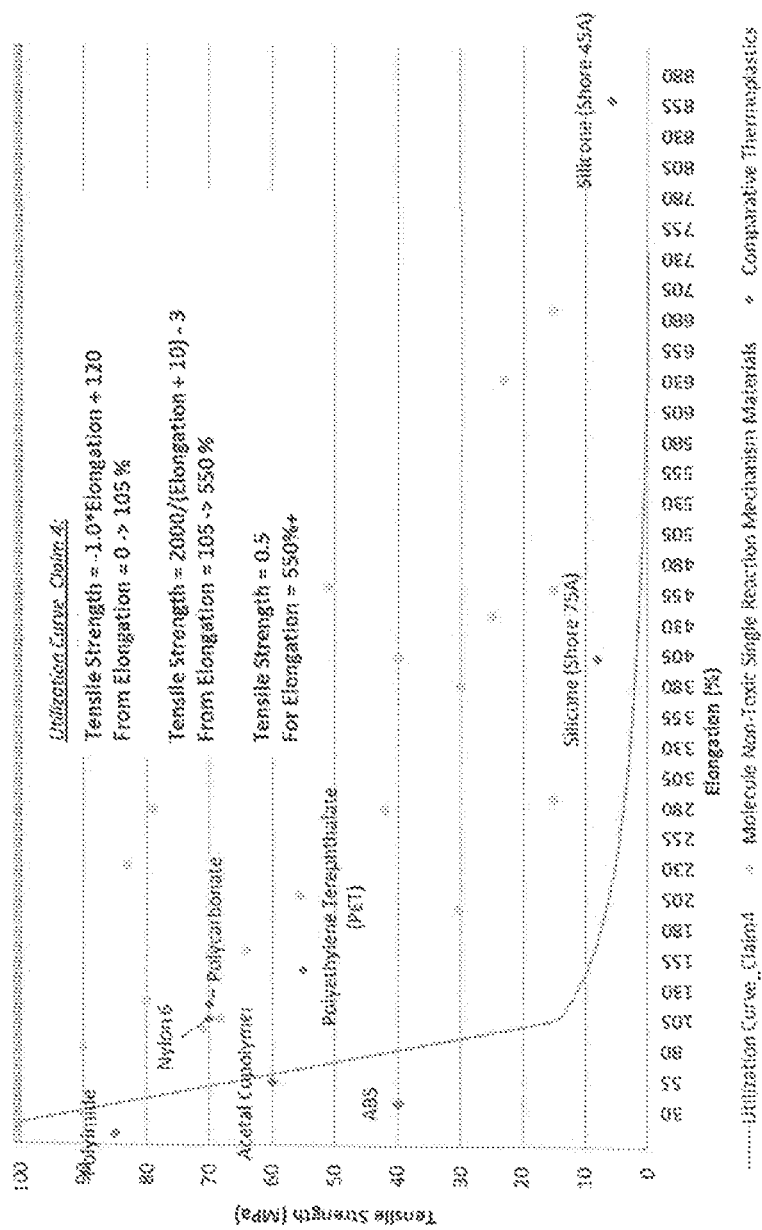
FIG. 1C is yet another plot of a single reaction mechanism, energy polymerizable polymers in accordance with the principles of the present invention.
Figure 2:
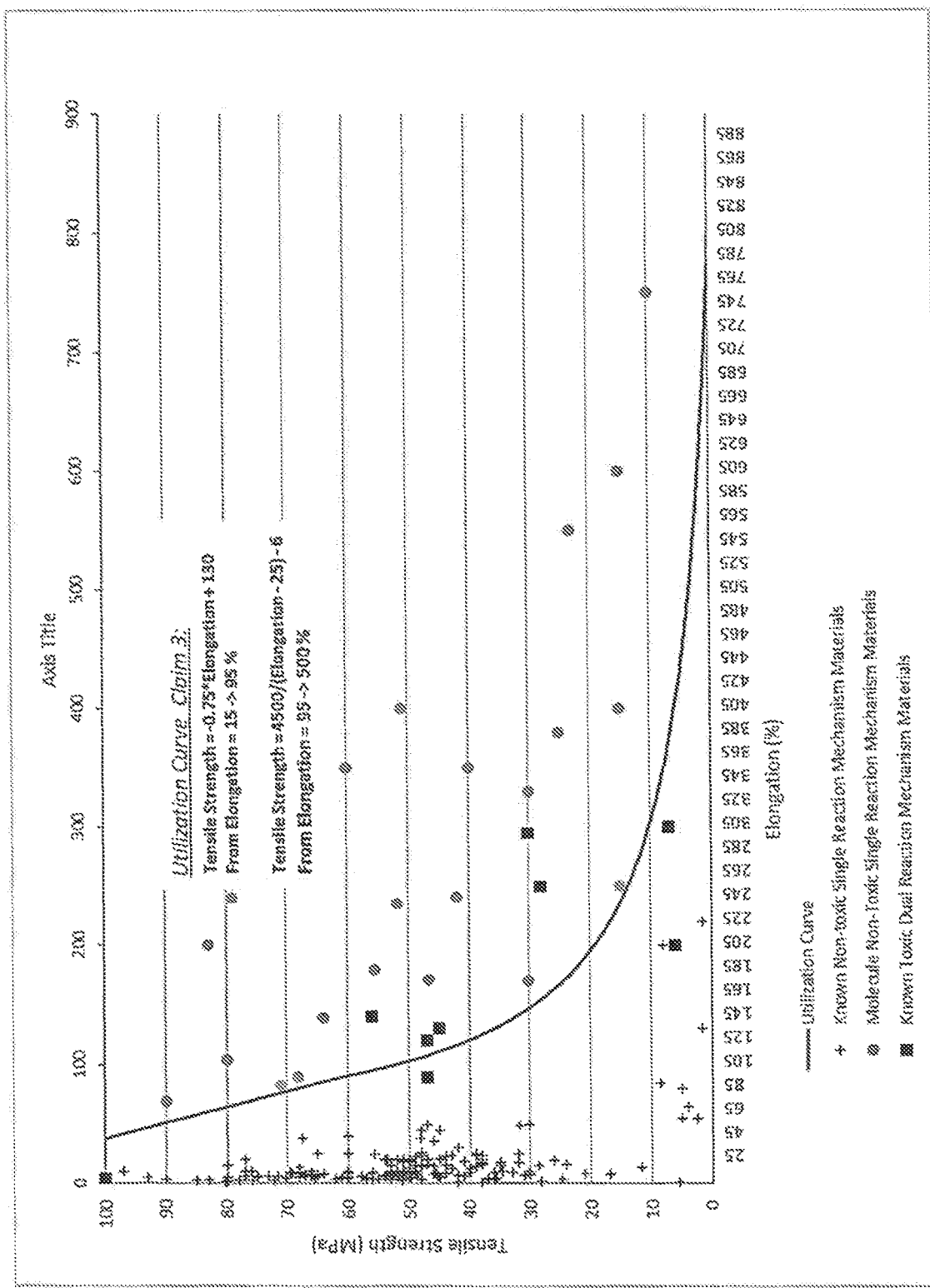
FIG. 2 is a plot of toxicity representation of tough polymerizable materials in accordance with the principles of the present invention.

In examples 1-3 shown below are given comparative example materials for the formation of products having a variety of different tensile properties, ranging from elastomeric, to semi-rigid, to flexible, as described above, where all Tensile Data is measured in accordance with ASTM D638, Type 4 test specimen. These examples are shown in FIGS. 1A and 1B, along with all known commercial single reaction mechanism energy polymerizable materials:

Example 1

| Name | Tensile Strength (MPa) | Elongation (%) | Young's Modulus (MPa) | Raw Material | Weight % |
|---|---|---|---|---|---|
| Rigid | 65.9 | 3.5 | 2403 | Acrylate Oligomer (eg. CN120Z) | 32 |
| | | | | Cyclic Trimethylol-propane Formal Acrylate | 10 |
| | | | | Trimethylolpropane ethoxylate triacrylate | 4 |
| | | | | Tricyclo[5.2.1.02,6]decanedi methanol diacrylate | 35 |
| | | | | Trimethylolpropane triacrylate | 18 |
| | | | | Diphenyl(2,4,6-trimethylbenzoyl)phosphine oxide | 1 |
| | | | | Total | 100 |

Example 2

| Name | Tensile Strength (MPa) | Elongation (%) | Young's Modulus (MPa) | Raw Material | Weight % |
|---|---|---|---|---|---|
| Tough | 35.1 | 28 | 1,430 | Acrylate Oligomer | 40 |
| | | | | Urethane Acrylate Oligomer (eg. Genomer 6019) | 7 |
| | | | | Cyclic Trimethylol-propane Formal Acrylate | 52 |
| | | | | Diphenyl(2,4,6-trimethylbenzoyl) phosphine oxide | 1 |
| | | | | Total | 100 |

Example 3

| Name | Tensile Strength (MPa) | Elongation (%) | Young's Modulus (MPa) | Raw Material | Weight % |
|---|---|---|---|---|---|
| Flexible | 3.3 | 83 | 4.3 | Acrylate Oligomer | 7 |
| | | | | Cyclic Trimethylol-propane Formal Acrylate | 27 |
| | | | | Acrylate Oligomer | 15 |
| | | | | 2-[[(Butylamino) carbonyl]oxy]ethyl acrylate | 50 |

-continued

| Name | Tensile Strength (MPa) | Elongation (%) | Young's Modulus (MPa) | Raw Material | Weight % |
|---|---|---|---|---|---|
| | | | | Diphenyl(2,4,6-trimethylbenzoyl) phosphine oxide | 1 |
| | | | | Total | 100 |

Further Examples, using Single Reaction Mechanism Energy Polymerizable liquids to create Photoplastics:

Example 4

| Name | Tensile Strength (MPa) | Elongation (%) | Young's Modulus (MPa) | Raw Material | Weight % |
|---|---|---|---|---|---|
| #4 | 72 | 108 | 1825 | Aliphatic Urethane Diacrylate Oligomer | 55.2 |
| | | | | Isobornyl Acrylate | 13.8 |
| | | | | Diphenyl(2,4,6-trimethylbenzoyl)phosphine oxide | 1.0 |
| | | | | 1-Vinyl-2-pyrrolidone | 30 |
| | | | | Total | 100 |

Example 5

| Name | Tensile Strength (MPa) | Elongation (%) | Young's Modulus (MPa) | Raw Material | Weight % |
|---|---|---|---|---|---|
| #5 | 48 | 104 | 1160 | Tricyclodecanediol diacrylate | 5 |
| | | | | Urethane Acrylate Oligomer | 37.6 |
| | | | | Isobornyl Methacrylate | 9.4 |
| | | | | Diphenyl(2,4,6-trimethylbenzoyl)phosphine oxide | 1 |
| | | | | 1-Vinyl-2-pyrrolidone | 47 |
| | | | | Total | 100 |

Example 6

| Name | Tensile Strength (MPa) | Elongation (%) | Young's Modulus (MPa) | Raw Material | Weight % |
|---|---|---|---|---|---|
| #6 | 25.4 | 178 | 360 | Urethane Diacrylate Oligomer | 40 |
| | | | | Diphenyl(2,4,6-trimethylbenzoyl)phosphine oxide | 1 |
| | | | | 1-Vinyl-2-pyrrolidone | 59 |
| | | | | Total | 100 |

Example 7

| Name | Tensile Strength (MPa) | Elongation (%) | Young's Modulus (MPa) | Raw Material | Weight % |
|---|---|---|---|---|---|
| #7 | 78 | 210 | 1650 | Urethane Acrylate Oligomer | 33.6 |
| | | | | Isobornyl Methacrylate | 15 |
| | | | | N-Vinylcaprolactam | |
| | | | | Diphenyl(2,4,6-trimethylbenzoyl)phosphine oxide | 1 |
| | | | | 1-Vinyl-2-pyrrolidone | 42 |
| | | | | Total | 100 |

Example 8

| Name | Tensile Strength (MPa) | Elongation (%) | Young's Modulus (MPa) | Raw Material | Weight % |
|---|---|---|---|---|---|
| #8 | 12 | 300 | 8 | Urethane Acrylate Oligomer | 60 |
| | | | | 1-Vinyl-2-pyrrolidone | 38 |
| | | | | Diphenyl(2,4,6-trimethylbenzoyl)phosphine oxide | 2 |
| | | | | Total | 100 |

Although 1-Vinyl-2-pyrrolidone and N-Vinylcaprolactam are shown in the examples above, many other monomers may be used to achieve desirable results. These include but are not limited to N-Vinylformamide, Acryloyl morpholine or Vinyl cinnamate.

Example #5 Molar Bond Ratio Calculation:

$$\text{Molar Bond Ratio of Monofunctional to Multifunctional Reactive Constituents} = \frac{\text{[Sum of moles of bonds contributed by monofunctional molecular species]}}{\text{[Sum of moles of bonds contributed by multifunctional molecular species]}}$$

First determine the moles of each raw material in a defined mass or volume of material.

$$100 \text{ grams} \times 47\% \text{ } NVP = 47 \text{ } g \text{ } NVP \times \frac{1 \text{ mol}}{111.14 \text{ } g} = 0.423 \text{ mol } NVP$$

$$100 \text{ grams} \times 37.6\% \text{ Urethane Acrylate Oligomer} =$$

$$37.6 g \text{ oligomer} \times \frac{1 \text{ mol}}{6,000 \text{ } g} = .00627 \text{ mol oligomer}$$

$$100 \text{ grams} \times 9.4\% \text{ Isobornyl Methacrylate} =$$

$$9.4 g \text{ } IBOMA \times \frac{1 \text{ mol}}{222.32 \text{ } g} = .0423 \text{ mol } IBOMA$$

$$100 \text{ grams} \times 5\% \text{ Tricyclodecanediol Diacrylate } (TCCDA) =$$

$$9.4 g \text{ } TCDDA \times \frac{1 \text{ mol}}{304.38 \text{ } g} = 0.0164 \text{ mol } TCDDA$$

Multiplying the moles of each component by their functionalities yields the moles of each bond type present in the formulation.

$$0.423 \text{ mol } NVP \times \frac{1 \text{ mol Unsaturated } N-\text{Vinyl Bond}}{1 \text{ mol } NVP} =$$

$$0.423 \text{ mol Monofunctional Unsaturated } N-\text{Vinyl Bonds}$$

$$0.00627 \text{ mol oligomer} \times \frac{2 \text{ mol Unsaturated Acrylate Bonds}}{1 \text{ mol oligomer}} =$$

$$0.0125 \text{ mol Multifunctional Unsaturated Urethane Diacrylate bonds}$$

$$0.0423 \text{ mol } IBOMA \times \frac{1 \text{ mol Unsaturated Methacrylate Bonds}}{1 \text{ mol } IBOMA} =$$

$$0.0423 \text{ mol Monofunctional Unsaturated Methacrylate Bonds}$$

$$0.0164 \text{ mol } TCDDA \times \frac{2 \text{ mol Unsaturated Acrylate Bonds}}{1 \text{ mol } TCCDA} =$$

$$0.0328 \text{ mol Multifunctional Unsaturated } TCCDA \text{ bonds}$$

Dividing the sum of moles of bonds contributed by monofunctional molecular species by the sum of moles of bonds contributed by multifunctional molecular species yields the Molar Bond ratio.

Molar Bond Ratio of Example 5 =

$$\frac{0.423 \text{ mol } NVP \text{ bonds} + .0423 \text{ mol } IBOMA \text{ bonds}}{0.0125 \text{ mol Urethane Oligomer Bonds} + 0.0328 \text{ mol } TCCDA \text{ bonds}} = 10.24$$

Molar Bond Ratio Calculations. Example calculations of molar bond ratio for examples #4 through #8 are displayed below.

Example #4 Molar Bond Ratio Calculation.

| Raw Material | Mass % | Functionality | Molecular Weight | Molar Bond Ratio |
|---|---|---|---|---|
| 1-Vinyl-2-Pyrrolidone | 30 | 1 | 111.14 | 10.65 |
| IBOA | 13.8 | 1 | 208.3 | |
| Aliphatic Urethane Diacrylate Oligomer | 55.2 | 2 | 3500 | |
| Mass sum in Formula | 99 | | | |

Example #5 Molar Bond Ratio Calculation.

| Raw Material | Mass % | Functionality | Molecular Weight | Molar Bond Ratio |
|---|---|---|---|---|
| 1-Vinyl-2-Pyrrolidone | 47 | 1 | 111.14 | 10.24 |
| Isobornyl Methacrylate | 9.4 | 1 | 222.33 | |
| Urethane Diacrylate Oligomer | 37.6 | 2 | 6000 | |
| Tricyclodecanediol Diacrylate | 5 | 2 | 304.38 | |
| Mass sum in Formula | 99 | | | |

Example #6 Molar Bond Ratio Calculation.

| Raw Material | Mass % | Functionality | Molecular Weight | Molar Bond Ratio |
|---|---|---|---|---|
| 1-Vinyl-2-Pyrrolidone | 59 | 1 | 111.14 | 26.54 |
| Aliphatic Urethane Diacrylate Oligomer | 40 | 2 | 4000 | |
| Mass sum in Formula | 99 | | | |

Example #7 Molar Bond Ratio Calculation.

| Raw Material | Mass % | Functionality | Molecular Weight | Molar Bond Ratio |
|---|---|---|---|---|
| 1-Vinyl-2-Pyrrolidone | 42 | 1 | 111.14 | 46.73 |
| Isobornyl Methacrylate | 8.4 | 1 | 222.33 | |
| Urethane Diacrylate Oligomer | 33.6 | 2 | 6000 | |
| NVC | 15 | 1 | 139.19 | |
| Mass sum in Formula | 99 | | | |

Example #8 Molar Bond Ratio Calculation.

| Raw Material | Mass % | Functionality | Molecular Weight | Molar Bond Ratio |
|---|---|---|---|---|
| 1-Vinyl-2-Pyrrolidone | 38 | 1 | 111.14 | 19.94 |
| Urethane Diacrylate Oligomer | 60 | 2 | 7000 | |
| Mass sum in Formula | 98 | | | |

In the example #8, wherein the molar bond ratio of monoofunctional to multifunctional species is at least 1000% (10:1 or higher molar bond ratio of monofunctional:multifunctional species).

In the example #7, wherein the molar bond ratio of monofunctional to multifunctional species is at least 3000% (30:1 or higher molar bond ratio of monofunctional:multifunctional species).

Molar Bond Ratio. Molar bond ratio is the ratio of the number of functional groups (potential sites of reaction/polymerization) contributed by a single distinct molecular species to the number of functional groups contributed by a different molecular species in a closed system. This is a relative ratio between different molecules, which considers their relative weight % in the formula, their molecular weight and their functionality (number of functional groups per molecule).

Molar Bond Ratio. One particularly useful definition of molar bond ratio used to characterize Photoplastic materials compares the number of functional groups contributed to a formulation: the sum of the monofunctional reactive species to the sum of the multifunctional reactive species. Molar bond ratio is the ratio of the number of functional groups (potential sites of reaction/polymerization) contributed by monofunctional species to the number of functional groups contributed by multifunctional species in a closed system. This is a relative ratio between monofunctional and multifunctional species which considers their relative weight % in the formula, their molecular weight and their functionality (number of functional groups per molecule). Monofunctional species are defined as molecules which contain 1 functional group that will form a covalent bond in the fully polymerized material. Multifunctional species are defined as molecules which contain more than one functional group that will form a covalent bond in a fully polymerized material. For a given system, the molar bond ratio is only calculated for functional groups that will be converted to covalent bonds when the material polymerizes. For example, if a monomer contains one acrylate group and one epoxide group in a 100% free radical polymerization reaction, the monomer would be considered monofunctional if only the acrylate group reacts. Considering the same molecule, if both free radical and cationic polymerization methods were utilized to polymerize the material, the monomer would be considered to have two functional groups, and therefore considered multifunctional in this system, since both the acrylate and epoxide groups would form covalent bonds in the final polymer structure. The molar bond ratio is another way to consider the crosslink density of a polymeric material.

The crosslink density of a polymeric material significantly influences the final physical and mechanical properties of polymeric materials. Highly crosslinked polymers generally display more brittle mechanical behaviors than polymers with lower crosslink densities. Crosslink density is a useful physical quality which can be used as an alternative method for characterizing materials as Photoplastics.

Fabricating the product may be paused or interrupted one or more times, to change the single reaction mechanism energy polymerizable liquid. In example embodiments, 3D formed objects may include multiple materials with different tensile strengths. While a fault line or plane may be formed in the intermediate by the interruption, if the subsequent single reaction mechanism energy polymerizable liquid is, in its second polymerizable material, reactive with that of the first, then the two distinct segments of the intermediate will cross-react and covalently couple to one another during the second polymerization (e.g., by heating or microwave irradiation). Thus, for example, any of the materials described herein may be sequentially changed to form a product having multiple distinct segments with different tensile properties, while still being a unitary product with the different segments covalently coupled to one another. In some embodiments, a 3D object may be formed with a plurality of regions with different materials and properties. For example, a 3D formed object could have one or more regions formed from a first material or first group of one or more materials having a Tensile Strength (MPa) in the range of about 30-100 or any range subsumed therein, and/or one or more regions formed from a second material or second group of one or more materials having a Tensile Strength (MPa) in the range of about 20-70 or any range subsumed therein and/or one or more regions formed from a third material or third group of one or more materials having a Tensile Strength (MPa) in the range of about 0.5-30 or any range subsumed therein or any combination of the foregoing. For example, the 3D object could have from 1-10 or more different regions (or any range subsumed therein) with varying tensile strength selected from any of the materials and tensile strengths described above. For example, a hinge can be formed, with the hinge comprising a rigid segment, coupled to a second elastic segment, coupled to a third rigid segment, by sequentially changing single reaction mechanism energy polymerizable liquids during the formation of the three-dimensional intermediate. A shock absorber or vibration dampener can be formed in like manner, with the second segment being either elastic or semi-rigid. A unitary rigid funnel and flexible hose assembly can be formed in like manner.

Figure 11:
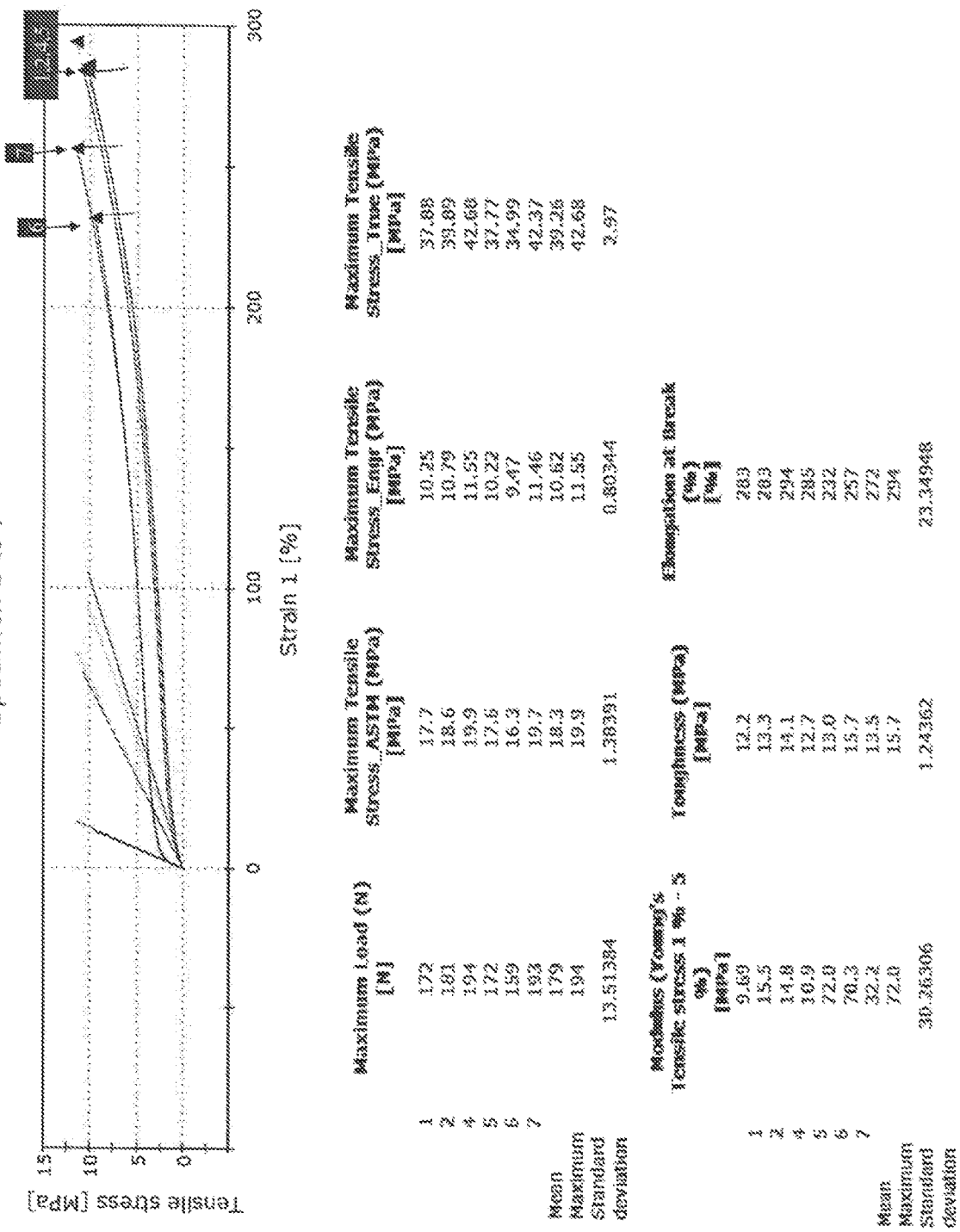
FIG. 11 illustrates a plot of tensile properties of a set of specimens in accordance with the principles of the present invention.

In some example embodiments, adjustable mechanical properties may be achievable within the same Photoplastic material/object, using a single reaction mechanism energy polymerizable resin, see FIG. 11. This can be accomplished by varying the energy polymerization of the Photoplastic material, which changes the reaction kinetics or reaction mechanism of the system. For instance, by changing the light irradiance, light energy, light wavelength or using Electron beam, it is possible to alter the polymerization reaction mechanism and polymerization reaction speeds. This is due in part to the different polymerizable functional groups that are contained in the resin, and their ability to react or not react with the same functional groups or different functional groups, which can change the final polymer molecular weight or network. This is also due in part to the same type of initiation being possible to polymerize all functional groups in the Photoplastic material. By controlling these process parameters, different mechanical properties may be achieved by using a single resin to build the following different chemical structures, which in turn, each have different mechanical properties: full IPN; semi-IPN; pseudo-IPN; dual Network; and random copolymer. Additionally, by choosing specific component stoichiometry, the ability to achieve different mechanical properties can be optimized. Specimens 1, 2, 4, 5 are 3D printed, 100 um layer thickness with 4 mJ/cm^2 395 nm LED per layer. Specimens 6 and 7 are 3D printed, 100 um layer thickness 25 mJ/cm$^2$ 395 nm LED per layer. All specimen are post cured with wide spectrum mercury bulb, 5 J/cm$^2$. Differences in mechanical properties can be seen, with a Young's Modulus going from ~10 MPa to ~70 MPa between the different print conditions. This represents a 7× difference in Young's Modulus. Additionally, elongation is seen to differ by approximately 10-20%. Finally, Shore D of the first groups of samples is: ~15, while shore D of the second groups of samples is: ~40. All specimen have the same formula as Example 8 above.

Additionally, different polymer networks, molecular weights, liquid-solid, solid-solid solubility or phase separation of the above structures are tunable and controllable by the process parameters stated above. Therefore, it is possible to greatly change the mechanical properties of a single resin, either pixel by pixel in a film or voxel by voxel in an object. Specifically, in additive manufacturing, VAT polymerization generally occurs with a Laser, Projector or Screen light source. Each of these and future light sources can be controlled to emit lower wattage or lower energy on a pixel by pixel basis. Therefore, three-dimension control of voxel polymerization is possible, which can allow for objects to be created with different mechanical properties in three-dimensional space. This greatly expands the 3D objects capabilities of any additive manufacturing machine.

A significant portion of SLA and DLP 3D printing methods use bottom-up printing techniques. An equally useful mechanism used in 3D printing is top down vat printing. Bottom-up and top down printing each have unique advantages and disadvantages. The quality and success rate of building parts through bottom-up 3D printing can be significantly influenced and limited by the green strength of the printed part. The green strength includes the strength, stiffness, and dimensional stability of 3D printed parts in their "green" state in the 3D printer prior to any additional post-cure methods which drives the reactive components to a higher percent conversion. If the green strength, or the mechanical integrity, of a 3D printed object overcomes the potential deformation effects introduced by gravity, undesired adhesion to the resin vat bottom, and other stimuli in a bottom-up 3D printing system, the 3D printed object is more likely to print with higher quality and consistency. The effect of green strength on print quality in a bottom-up system can be significantly influenced by 3D printed part geometry and print conditions. Top down vat printing techniques reduce the influence of some qualities, such as green strength, on the success of the printing process. Top down vat printing techniques leave the printed part in a vat of its constituent liquid material while printing, which acts as a buffer against the forces of gravity on the printed part. For this reason, the printed part can display a "floating" behavior based on the comparable densities of the printed part and the surrounding fluid. The ability of the printed part to "float" in the resin vat leads to less net force applied to the part from gravity during printing, especially if green strength is low and/or interlayer adhesion is poor in the green state. Alternatively, the viscosity of the top down vat resin can introduce undesirable forces on the green part while printing, which can cause deformation and the introduction of defects. To reduce the risk of deformation from solid-liquid interactions, low viscosity resins below 750 cP are desired. One potential advantage for Photoplastics in top down printing techniques is the ability to formulate them to low viscosities. Photoplastic materials may have low green strength, which suggests that top down vat printing might be a more suitable method than bottom-up printing.

F. Additional Examples of 3D Objects.

The above methods, structures, materials, compositions and properties may be used to 3D print a virtually unlimited number of products. Examples include, but are not limited to, medical devices and implantable medical devices such as stents, drug delivery depots, catheters, bladder, breast implants, testicle implants, pectoral implants, eye implants, contact lenses, dental aligners, microfluidics, seals, shrouds, and other applications requiring high biocompatibility, functional structures, microneedle arrays, fibers, rods, waveguides, micromechanical devices, microfluidic devices; fasteners; electronic device housings; gears, propellers, and impellers; wheels, mechanical device housings; tools: structural elements; hinges including living hinges; boat and watercraft hulls and decks; wheels; bottles, jars and other containers; pipes, liquid tubes and connectors; foot-ware soles, heels, innersoles and midsoles; bushings, O-rings and gaskets; shock absorbers, funnel/hose assembly, cushions; electronic device housings; shin guards, athletic cups, knee pads, elbow pads, foam liners, padding or inserts, helmets, helmet straps, head gear, shoe cleats, gloves, other wearable or athletic equipment, brushes, combs, rings, jewelry, buttons, snaps, fasteners, watch bands or watch housings, mobile phone or tablet casings or housings, computer keyboards or keyboard buttons or components, remote control buttons or components, auto dashboard components, buttons, dials, auto body parts, paneling, other automotive, aircraft or boat parts, cookware, bakeware, kitchen utensils, steamers and any number of other 3D objects. The universe of useful 3D products that may be formed is greatly expanded by the ability to impart a wide range of shapes and properties, including elastomeric properties, through the use of single reaction mechanism energy polymerization where a shape can be locked-in while printing subsequent Energy Polymerizing can be used to provide elastomeric or other desired properties. Any of the above described structures, materials and properties can be combined to form 3D objects including the 3D formed products described above. These are examples only and any number of other 3D objects can be formed using the methods and materials described herein.

IV. Alternate Methods and Apparatus.

While the present invention is preferably carried out by Stereolithography, Material Jetting or Inkjet Printing, as described in detail above and in further detail below, in some embodiments alternate methods and apparatus for bottom-up or top down three-dimension fabrication may be used, including layer-by-layer fabrication. Examples of such methods and apparatus include, but are not limited to, those described in U.S. Pat. Nos. 5,236,637; 5,391,072; 5,529,473; 7,438,846; 7,892,474; 8,110,135; U.S. Patent Application Publication Nos. 2013/0292862 and 2013/029521; and PCT Application Publication No. WO 2015/164234, the entire contents of which are incorporated herein by reference.

The advantages of a Photoplastic material are many, but can be summarized as the following: The ability to achieve engineering thermoplastic properties and performance through an energy polymerizable material. The manufacturing techniques when using thermoplastics are severely limited due to the requirement to melt the thermoplastic and then deposit/mold into the desired shape. With an energy polymerizable material, the manufacturing techniques are almost unlimited, so long as there is an energy source available for polymerization. These techniques include inkjet printing, 3D printing, molding, laminating, and many more.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A free radical polymerizable liquid for forming a three-dimensional object, the free radical polymerizable liquid comprising:
   a reactive oligomer, the reactive oligomer being at least one of (i) a multi-functional methacrylate oligomer, and (ii) a multi-functional acrylate oligomer; and
   a reactive monofunctional monomer, the reactive monofunctional monomer being at least one of (i) a monofunctional N-vinyl monomer, (ii) a monofunctional vinyl ether monomer, (iii) a monofunctional vinyl ester monomer, (iv) a monofunctional vinylamide monomer, (v) a styrene monomer, (vi) a monofunctional acrylamide monomer, (vii) a monofunctional (meth)acrylate monomer, (viii) a cyanoacrylate monomer, (ix) a monofunctional vinyl carbonate monomer, (x) a monofunctional acryloyl monomer, and (xi) a monofunctional vinyl carbamate monomer,
   wherein a molar bond ratio of the reactive ethylenically unsaturated groups of the reactive monofunctional species to the reactive ethylenically unsaturated groups of the reactive multi-functional species is at least 10:1,
   the free radical polymerizable liquid being an energy polymerizable liquid hardenable by a single reaction mechanism forming a photoplastic material.

2. The polymerizable liquid of claim 1, further comprising a photoinitiator from about 0.01 percent to about 15 percent by weight.

3. The polymerizable liquid of claim 1, wherein the polymerizable liquid has a toughness equal to or greater than a utilization curve defined by the expressions: 1) ultimate tensile strength (MPa)=−0.75×elongation+130 for elongations from about 15% to about 95%, 2) ultimate tensile strength (MPa)=4500/(elongation−25)−5 for elongations from about 95% to about 500%.

4. The polymerizable liquid of claim 1, wherein the polymerizable liquid has a toughness equal to or greater than a utilization curve defined by the expressions: 1) ultimate tensile strength (MPa)=−1×elongation+120 for elongations from less than 105%, 2) ultimate tensile strength (MPa) =2000/(elongation+10)−3 for elongations from about 105% to about 550% 3) ultimate tensile strength (MPa)=0.5 for elongations greater than about 550%.

5. The polymerizable liquid of claim 1, wherein the polymerized material reaches prescribed mechanical properties without supplied heat.

6. The polymerizable liquid of claim 1, further comprising at least one of a non-reactive light absorbing pigment in an amount from about 0.001 percent to about 10 percent by weight, a filler, a polymerization inhibitor, and a polymerization catalyst.

7. The polymerizable liquid of claim 1, further comprising a non-reactive light absorbing pigment in an amount from about 0.001 percent to about 10 percent by weight, and a filler.

8. The polymerizable liquid of claim 1, wherein the oligomer and the monomer react by a same polymerization mechanism and have different reaction rates.

9. The polymerizable liquid of claim 1, wherein the solubility of the monomer and oligomer change during polymerization, which assists homopolymerization of either the monomeric or oligomeric species.

10. The polymerizable liquid of claim 1, wherein polymerization creates a material with more than one glass transition temperature.

11. The polymerizable liquid of claim 1, wherein polymerization creates a material with two different glass transition temperatures, with a difference in Tg by at least 60 degrees C.

12. The polymerizable liquid of claim 1, wherein the molar bond ratio of the reactive ethylenically unsaturated groups of the reactive monofunctional species to the reactive ethylenically unsaturated groups of the reactive multi-functional species is at least 25:1.

13. The polymerizable liquid of claim 12, wherein the molar bond ratio of the reactive ethylenically unsaturated groups of the reactive monofunctional species to the reactive ethylenically unsaturated groups of the reactive multi-functional species is at least 30:1.

14. The polymerizable liquid of claim 1, wherein the polymerizable liquid forms a print on a substrate.

15. The polymerizable liquid of claim 1, wherein the polymerizable liquid is hardened to form a film or three-dimensional object by stereolithography (SLA), digital light projection (DLP), material jetting, or inkjet printing.

16. The polymerizable liquid of claim 15, wherein the thickness of the inkjet film or the 3D printed layer is greater than about 30 um.

17. The polymerizable liquid of claim 1, wherein when hardened the polymerizable liquid has adjustable mechanical properties resulting from changing the energy polymerization conditions.

18. The polymerizable liquid of claim 1, wherein the polymerizable liquid is non-toxic.

19. The polymerizable liquid of claim 1, wherein the oligomer has a molecular weight greater than about 1500 grams/mole.

20. The polymerizable liquid of claim 19, wherein the oligomer has a molecular weight greater than about 4000 grams/mole.

21. The polymerizable liquid of claim 1, wherein the monomer is a mono-functional N-vinyl, vinyl ester, or acryloyl selected from the group consisting of N-Vinylpyrrolidone, N-Vinylcaprolactam, N-Vinylformamide, Acryloyl morpholine or Vinyl cinnamate.

22. A method for forming a polymerizable liquid, the method comprising:
mixing together:
a reactive oligomer, the reactive oligomer being at least one of (i) a 1 or more functional N-vinyl oligomer, (ii) a 1 or more functional vinyl ether oligomer, (iii) a 1 or more functional vinyl ester oligomer, (iv) a 1 or more functional vinylamide oligomer, (v) a styrene oligomer, (vi) a 1 or more functional acrylamide oligomer, (vii) a 1 or more functional (meth)acrylate oligomer having a different reaction speed than the 1 or more functional (meth)acrylate monomer, (viii) a cyanoacrylate oligomer, (ix) a 1 or more functional vinyl carbonate oligomer, and (x) a 1 or more functional acryloyl oligomer, (xi) 1 or more functional vinyl carbamate oligomer; and
a reactive monomer, the reactive monomer being at least one of (i) a 1 or more functional N-vinyl monomer, (ii) a 1 or more functional vinyl ether monomer, (iii) a 1 or more functional vinyl ester monomer, (iv) a 1 or more functional vinylamide monomer, (v) a styrene monomer, (vi) a 1 or more functional acrylamide monomer, (vii) a 1 or more functional (meth)acrylate monomer of having a different reaction speed than the 1 or more functional (meth)acrylate oligomer, (viii) a cyanoacrylate monomer, (ix) a 1 or more functional vinyl carbonate monomer, (x) a 1 or more functional acryloyl monomer, and (xi) 1 or more functional vinyl carbamate monomer,
wherein a molar bond ratio of the reactive ethylenically unsaturated groups of the reactive monofunctional species to the reactive ethylenically unsaturated groups of the reactive multi-functional species is at least 10:1,
the polymerizable liquid being an energy polymerizable liquid hardenable by a single reaction mechanism to form a Photoplastic material.

23. The method of claim 22, wherein the polymerizable liquid is hardened to produce a film or three-dimensional object by stereolithography (SLA), digital light/projection (DLP), material jetting (Inkjet Printing in 3D), or inkjet printing.

24. The method of claim 23, wherein the film or three-dimensional object is a medical device or part of footwear or part of soft robotics.

25. The method of claim 23, wherein the film or three-dimensional object is a hydrogel.

26. The method of claim 21, wherein pixel or voxel polymerization is employed to produce different physical properties by altering the energy polymerization conditions.

27. The method of claim 22, further comprising irradiating the polymerizable liquid with patterned irradiation.

28. The method of claim 22, further comprising mixing in a photoinitiator in an amount from about 0.01 percent to about 15 percent by weight.

29. An article comprising:
an energy polymerizable liquid hardened by a single reaction mechanism forming a Photoplastic material, the energy polymerizable liquid being made from:
a reactive oligomer, the reactive oligomer being at least one of (i) a 1 or more functional N-vinyl oligomer, (ii) a 1 or more functional vinyl ether oligomer, (iii) a 1 or more functional vinyl ester oligomer, (iv) a 1 or more functional vinylamide oligomer, (v) a styrene oligomer, (vi) a 1 or more functional acrylamide oligomer, (vii) a 1 or more functional (meth)acrylate oligomer having a different reaction speed than the 1 or more functional (meth)acrylate monomer, (viii) a cyanoacrylate oligomer, (ix) a 1 or more functional vinyl carbonate oligomer, and (x) a 1 or more functional acryloyl oligomer, (xi) 1 or more functional vinyl carbamate oligomer; and a reactive monomer, the reactive monomer being at least one of (i) a 1 or more functional N-vinyl monomer, (ii) a 1 or more functional vinyl ether monomer, (iii) a 1 or more functional vinyl ester monomer, (iv) a 1 or more functional vinylamide monomer, (v) a styrene monomer, (vi) a 1 or more functional acrylamide monomer, (vii) a 1 or more functional (meth)acrylate monomer of having a different reaction speed than the 1 or more functional (meth)acrylate oligomer, (viii) a cyanoacrylate monomer, (ix) a 1 or more functional vinyl carbonate monomer, (x) a 1 or more functional acryloyl monomer, and (xi) 1 or more functional vinyl carbamate monomer, wherein a molar bond ratio of the reactive ethylenically unsaturated groups of the reactive monofunctional species to the reactive ethylenically unsaturated groups of the reactive multi-functional species is at least 10:1.

30. The article of claim 29, wherein when hardened the polymerizable liquid has adjustable mechanical properties by changing the energy polymerization conditions.

\* \* \* \* \*